United States Patent
Rao et al.

(10) Patent No.: US 12,536,252 B2
(45) Date of Patent: Jan. 27, 2026

(54) HEADLESS NODE PROGRAMMING SYSTEM

(71) Applicant: Dell Products L.P., Round Rock, TX (US)

(72) Inventors: Balaji Bapu Gururaja Rao, Austin, TX (US); Trevor Christian Cockrell, Hutto, TX (US); Brahmananda Reddy Thodati, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 18/659,351

(22) Filed: May 9, 2024

(65) Prior Publication Data

US 2025/0348559 A1  Nov. 13, 2025

(51) Int. Cl.
*G06F 21/10* (2013.01)

(52) U.S. Cl.
CPC .... *G06F 21/105* (2013.01); *G06F 2221/2153* (2013.01)

(58) Field of Classification Search
CPC .......................... G06F 21/105; G06F 2221/53
USPC ............................................................ 726/26
See application file for complete search history.

(56) References Cited

U.S. PATENT DOCUMENTS

| | | | |
|---|---|---|---|
| 9,185,641 B2 | 11/2015 | Ilsar et al. | |
| 9,778,844 B2 | 10/2017 | Balakrishnan et al. | |
| 2010/0212026 A1* | 8/2010 | Yoshimura | H04N 1/00344 718/1 |
| 2022/0239473 A1* | 7/2022 | Beredimas | G06F 21/44 |
| 2024/0405994 A1* | 12/2024 | Jurss | G06Q 20/4016 |

\* cited by examiner

*Primary Examiner* — Michael S McNally
(74) *Attorney, Agent, or Firm* — Joseph Mencher

(57) ABSTRACT

A headless node programming system includes a Baseboard Management Controller (BMC) device that is coupled to a headless node device. The BMC device receives a first headless node programming Software Development Kit (SDK) and authenticates the first headless node programming SDK. In response to authenticating the first headless node programming SDK, the BMC device uses the headless node programming SDK to configure itself with a first headless node programming SDK subsystem. The BMC device then uses the first headless node programming SDK subsystem to program first data on the headless node device.

20 Claims, 29 Drawing Sheets

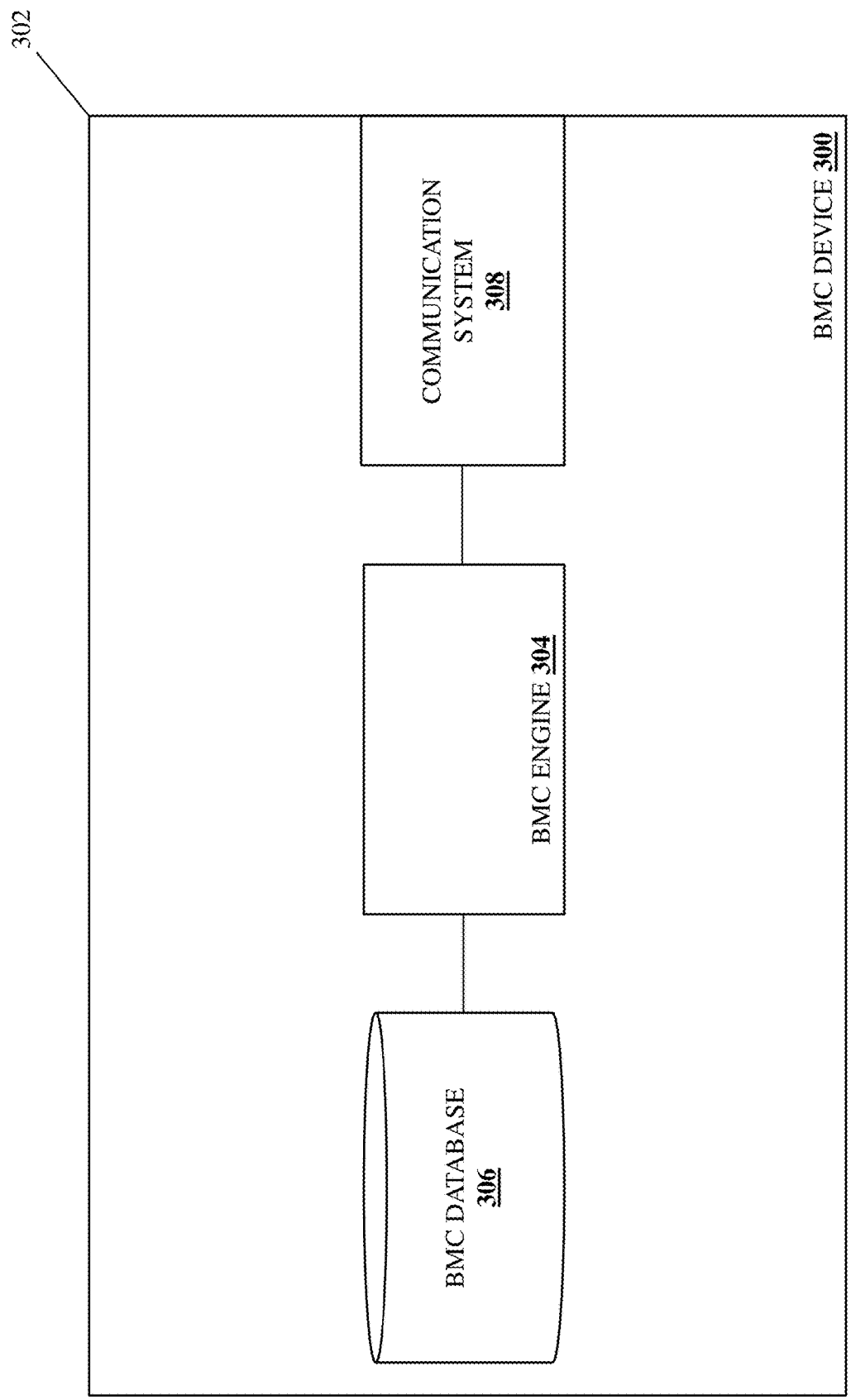

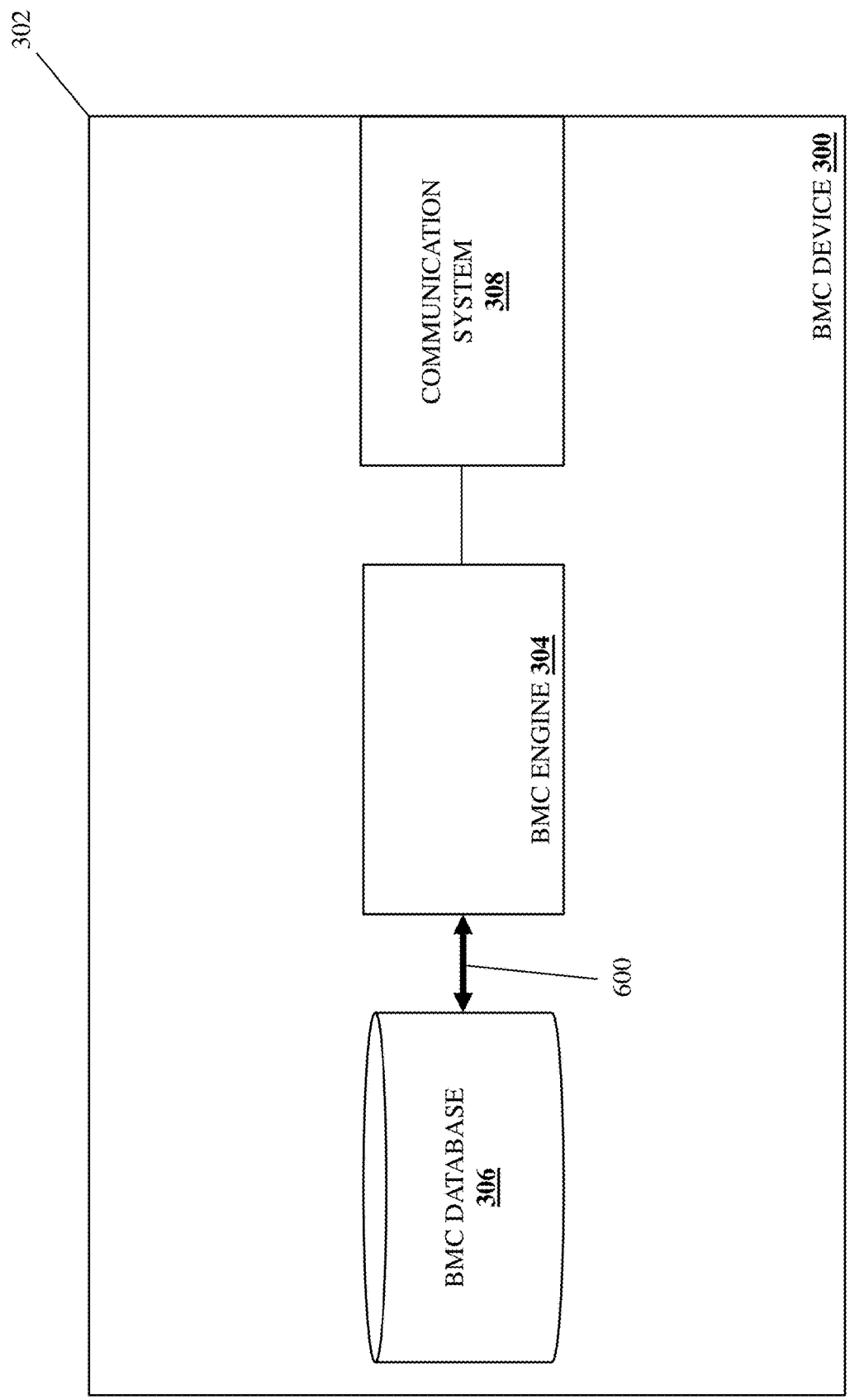

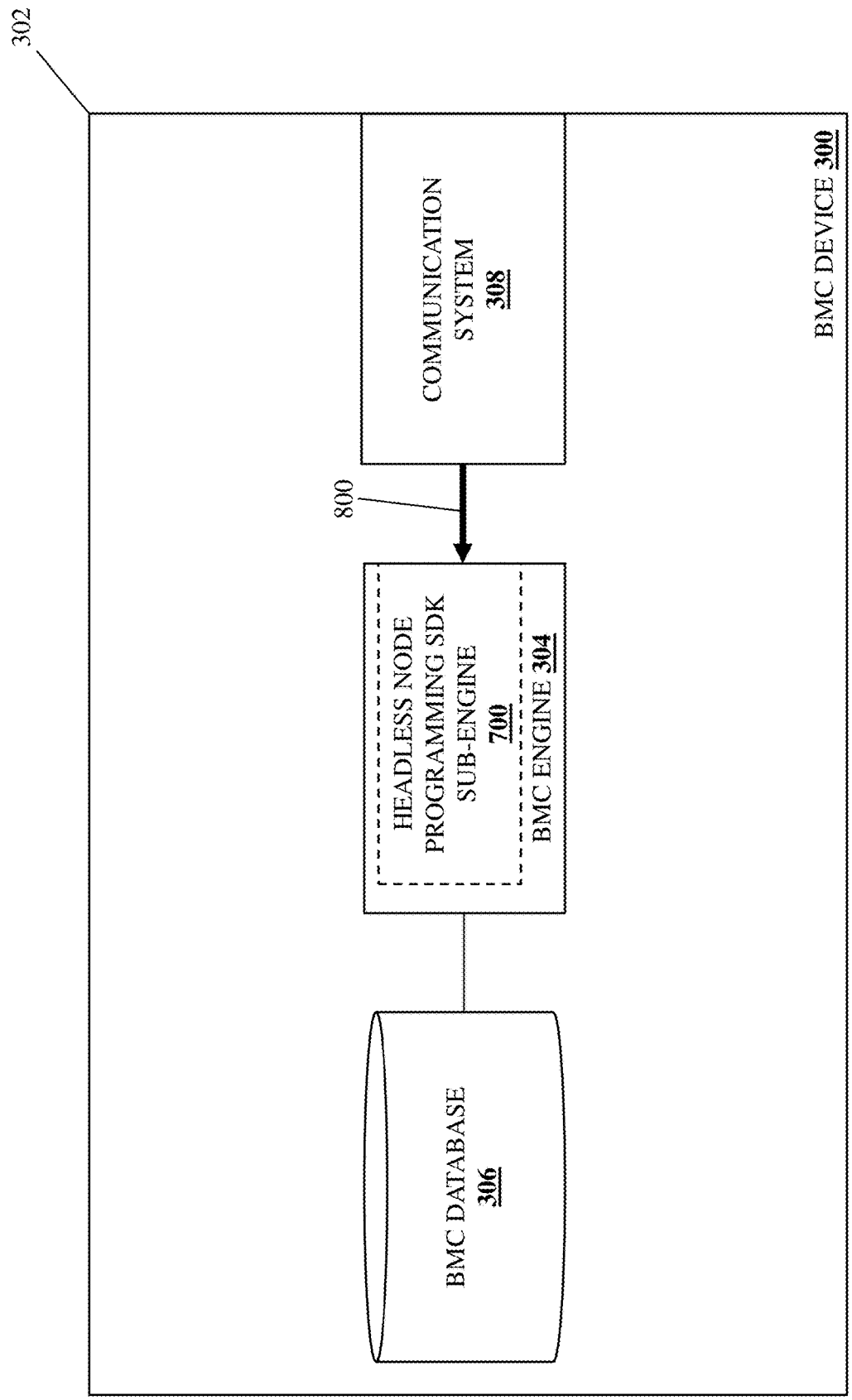

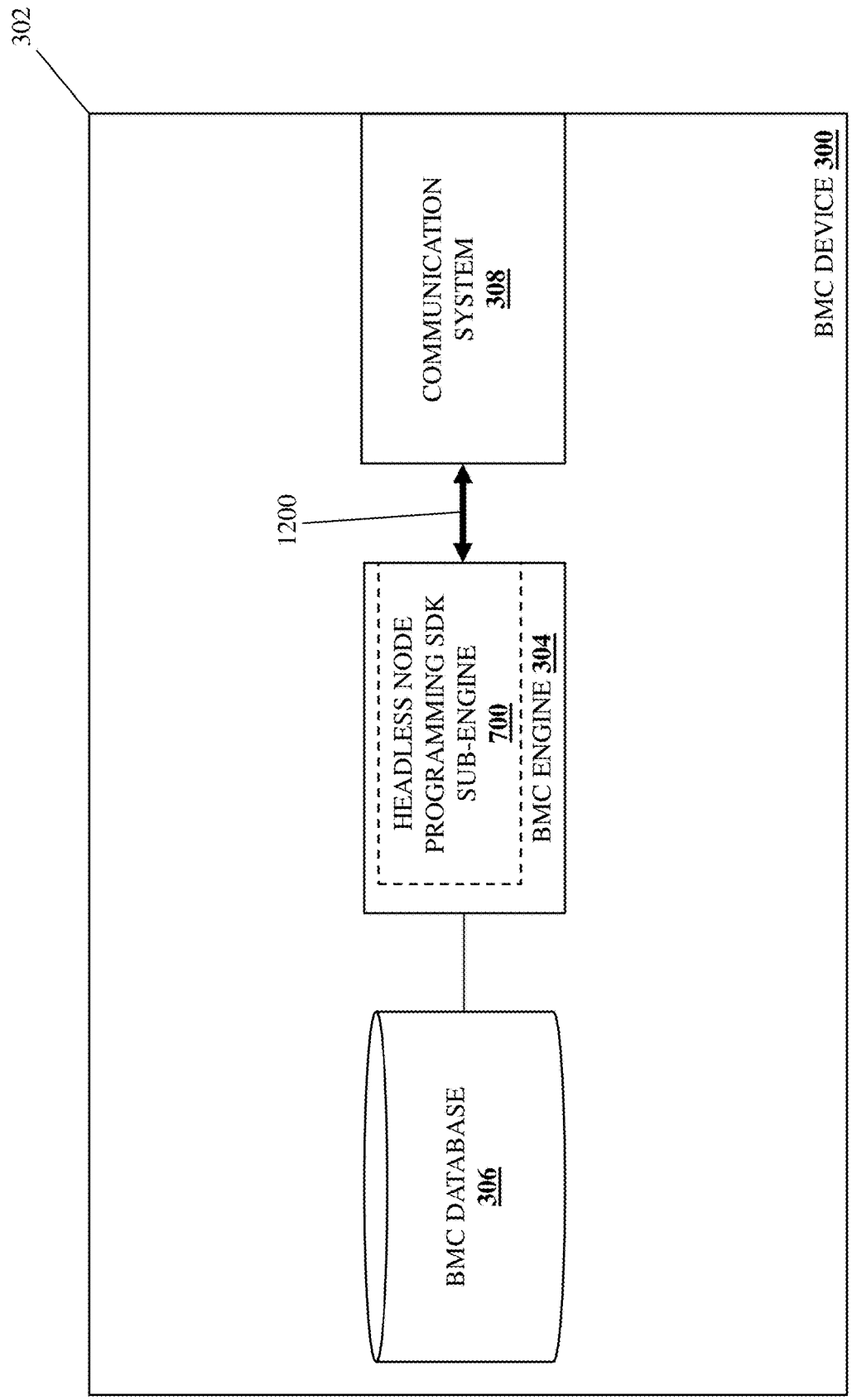

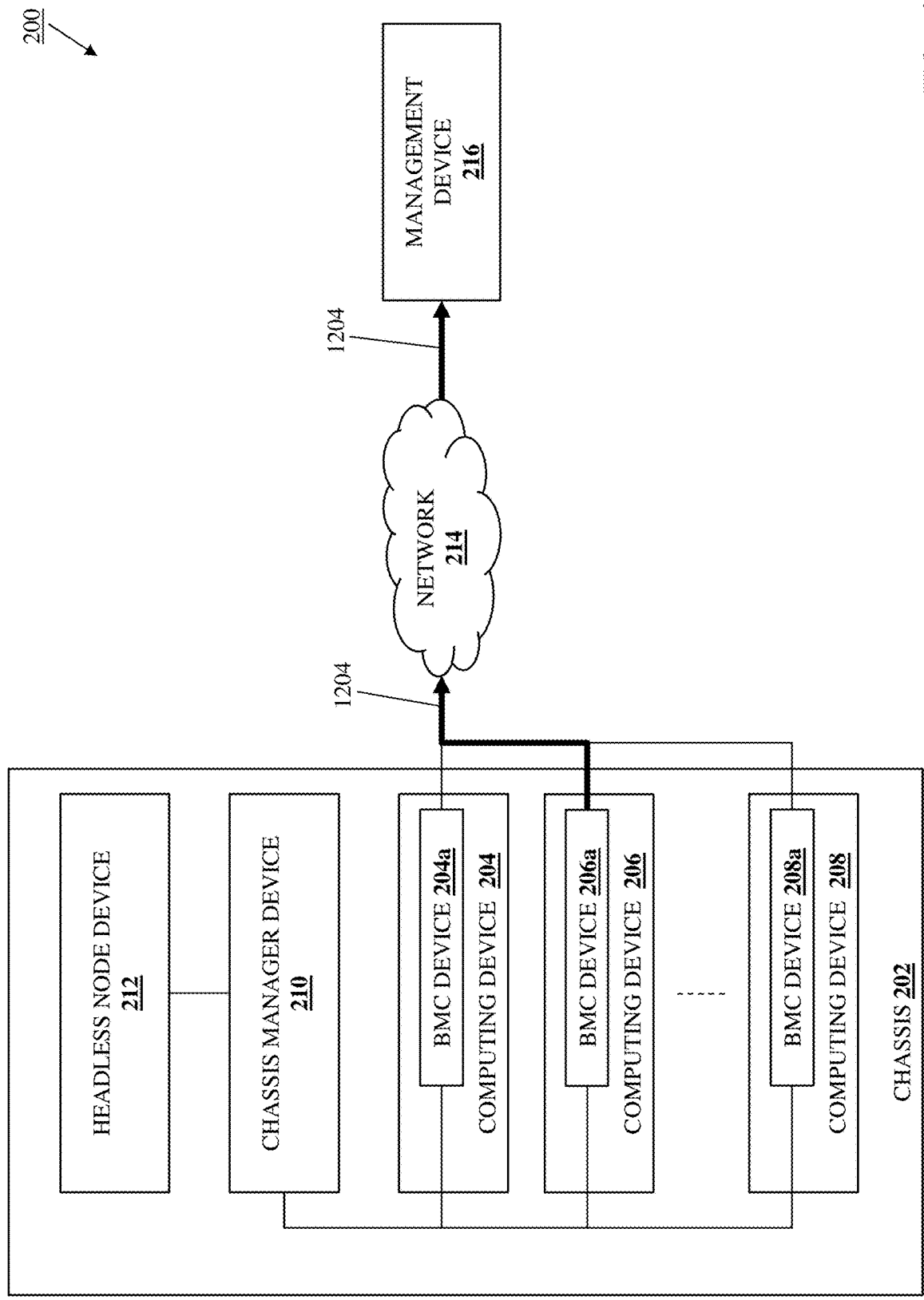

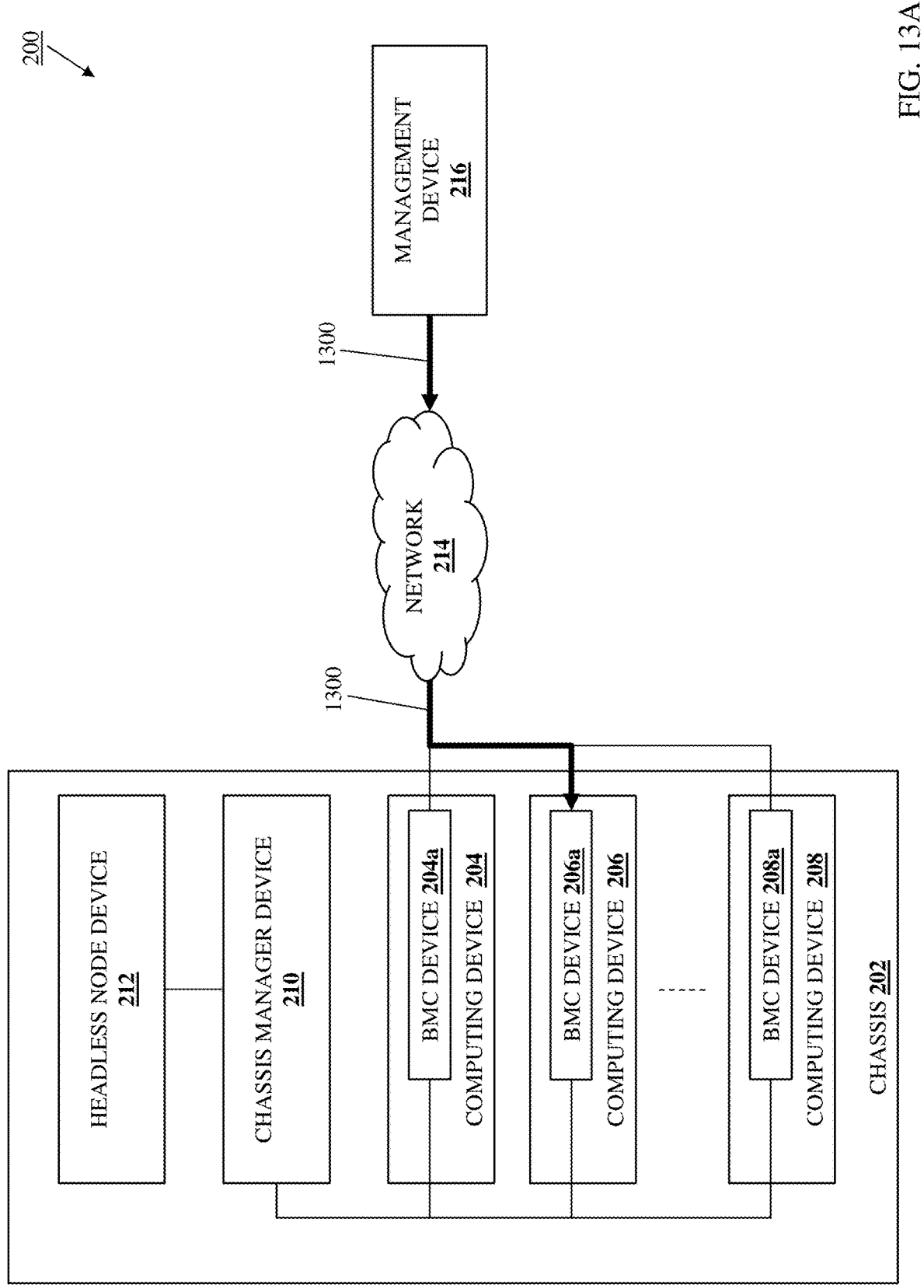

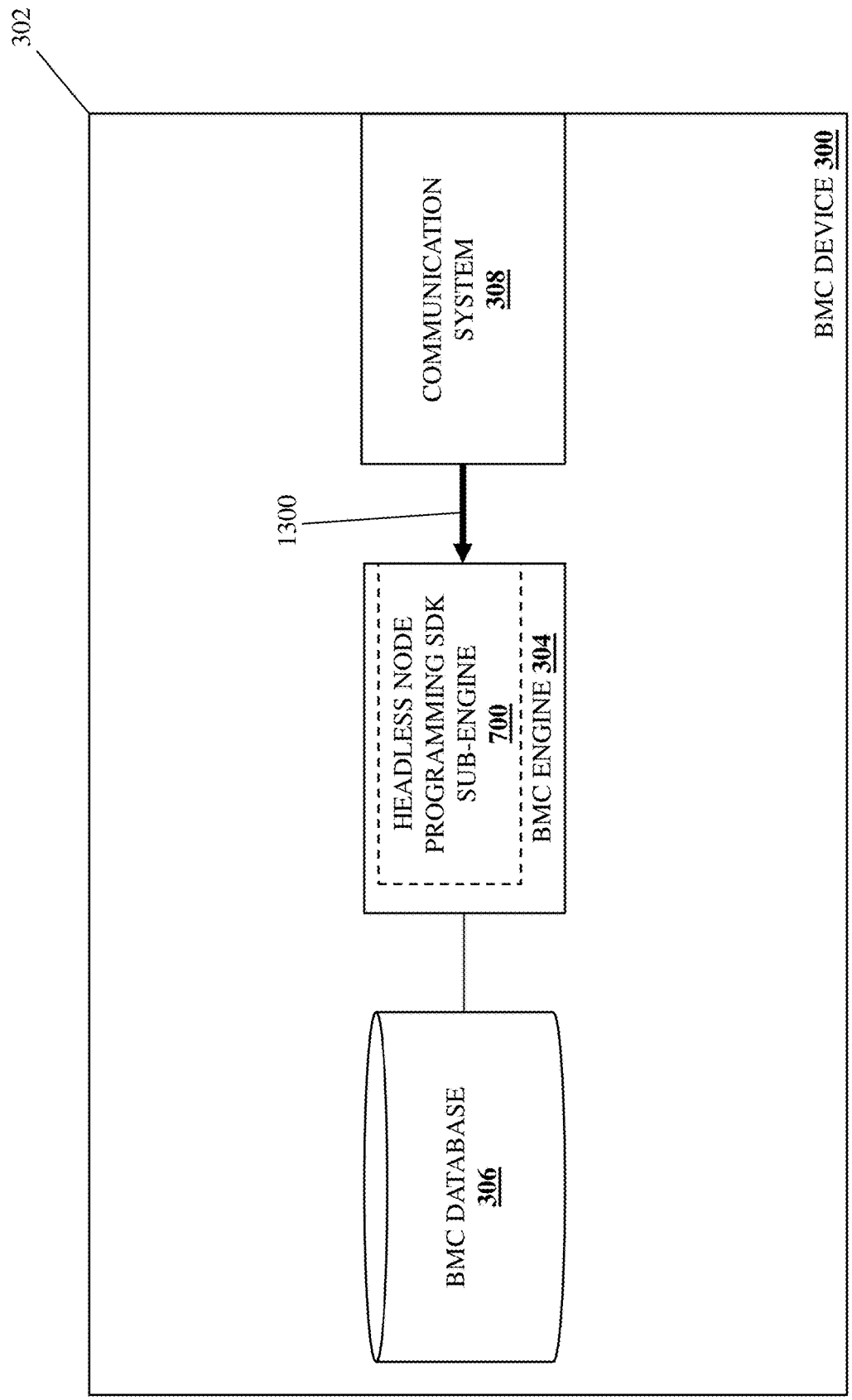

HEADLESS NODE PROGRAMMING SYSTEM

BACKGROUND

The present disclosure relates generally to information handling systems, and more particularly to programming an information handling system that provides a headless node.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes configured as "headless node devices" that operate without a monitor, keyboard, mouse (or virtual Keyboard/Video/Mouse (vKVM)), that are not configured to output video, and that otherwise do not include any front-end user/management interfaces that would allow direct human interaction with the headless node device. However, there are some situations in which it is desirable to program, write, or otherwise provide data on a headless node device, such as when a headless node device user wishes to program a user-specific headless node device identifier (e.g., a "service tag") on the headless node device, user-specific branding information on the headless node device, and/or other headless node device data that would be apparent to one of skill in the art in possession of the present disclosure. However, the programming of data on a headless node device raises issues.

For example, conventional headless node device programming techniques to program data (e.g., the user-specific data discussed above) on a headless node device outside a "factory"/"headless-node-device-manufacturing" scenario rely on a BMC device that is coupled to that headless node device (e.g., a BMC device in a server device that is included in a chassis with that headless node device), the use of an Intelligent Platform Management Interface-over-Local Area Network (IPMI-over-LAN) interface on that BMC device, and the configuration of a chassis manager device to operate as an intermediary device between the BMC device and the headless node device t. As will be appreciated by one of skill in the art in possession of the present disclosure, the IPMI-over-LAN interface allows the BMC device to receive data via a network from a user and transmit that data to the chassis manager device, and the chassis manager device must be configured with firmware to program the headless node device with the data received via the BMC device.

However, security researchers have been warning about security issues with the use of the IPMI-over-LAN interface on BMC devices for at least a decade. As such, while the IMPI-over-LAN interface on BMC devices is likely to remain (i.e., due to its "legacy" use and corresponding expected presence by some users), BMC device providers and/or server device providers have begun "blocking" or otherwise no longer supporting the use of the IPMI-over-LAN interface on BMC devices used in their computing systems. As such, the conventional headless node device programming techniques described above are not, or will no longer be, available in such computing systems.

Accordingly, it would be desirable to provide a headless node programming system that addresses the issues discussed above.

SUMMARY

According to one embodiment, an Information Handling System (IHS) includes a Baseboard Management Controller (BMC) processing system; and a BMC memory system that is coupled to the BMC processing system and that includes instructions that, when executed by the BMC processing system, cause the processing system to provide a BMC engine that is configured to: receive a first headless node programming Software Development Kit (SDK); authenticate the first headless node programming SDK; configure, using the first headless node programming SDK and in response to authenticating the first headless node programming SDK, the BMC engine with a first headless node programming SDK sub-engine; and program, using the first headless node programming SDK sub-engine, first data on a headless node device that is coupled to the BMC processing system.

BRIEF DESCRIPTION OF THE DRAWINGS

FIG. 3 is a schematic view illustrating an embodiment of a BMC device that may be included in the networked system of FIGS. 2A or 2B and that may provide the headless node programming system of the present disclosure.

FIG. 6 is a schematic view illustrating an embodiment of the operation of the BMC device of FIG. 3 during the method of FIG. 4.

FIG. 8C is a schematic view illustrating an embodiment of the operation of the BMC device of FIG. 3 during the method of FIG. 4.

FIG. 12A is a schematic view illustrating an embodiment of the operation of the BMC device of FIG. 3 during the method of FIG. 4.

FIG. 12E is a schematic view illustrating an embodiment of the operation of the networked system of FIG. 2A during the method of FIG. 4.

FIG. 13A is a schematic view illustrating an embodiment of the operation of the networked system of FIG. 2A during the method of FIG. 4.

FIG. 13C is a schematic view illustrating an embodiment of the operation of the BMC device of FIG. 3 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
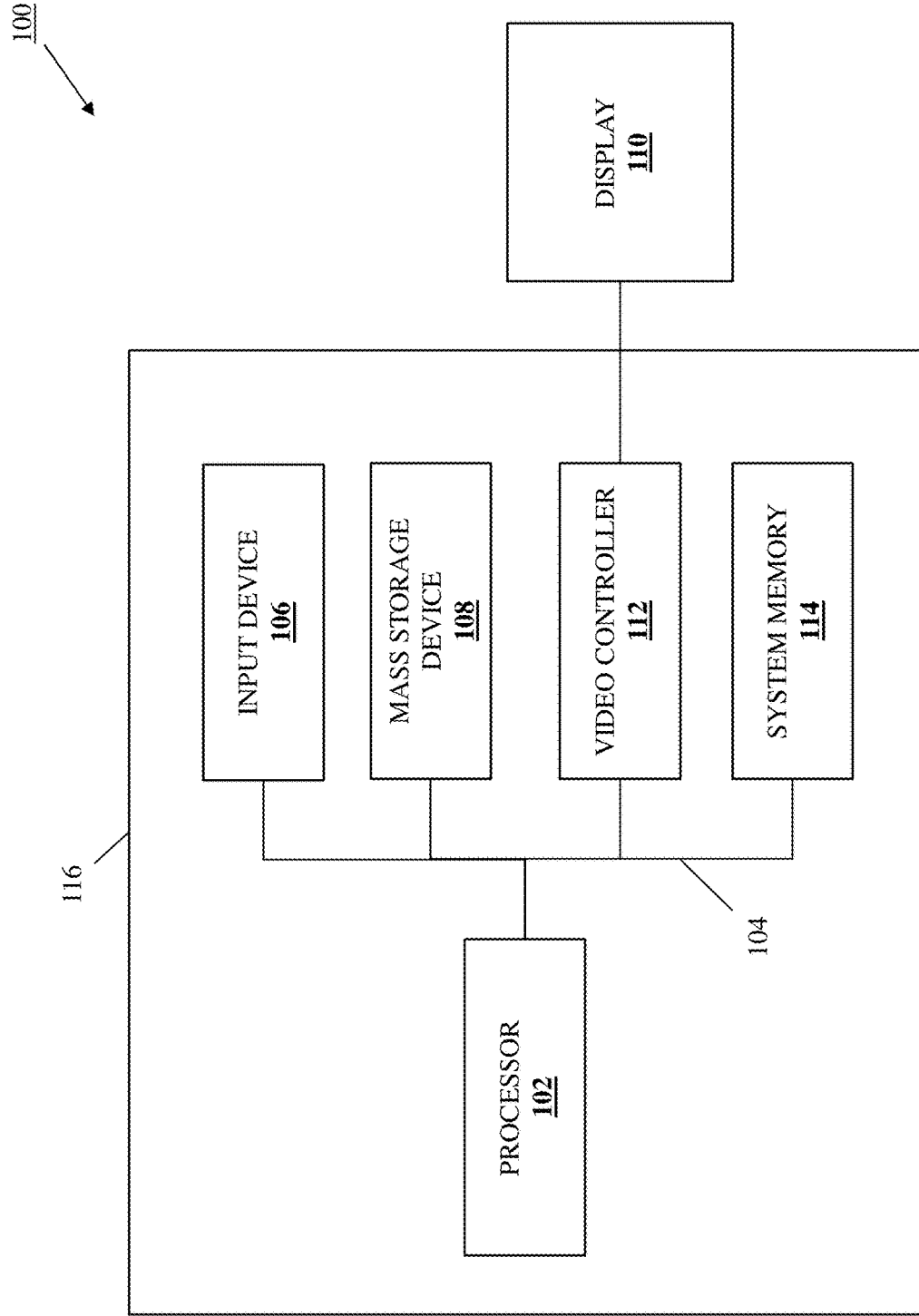
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
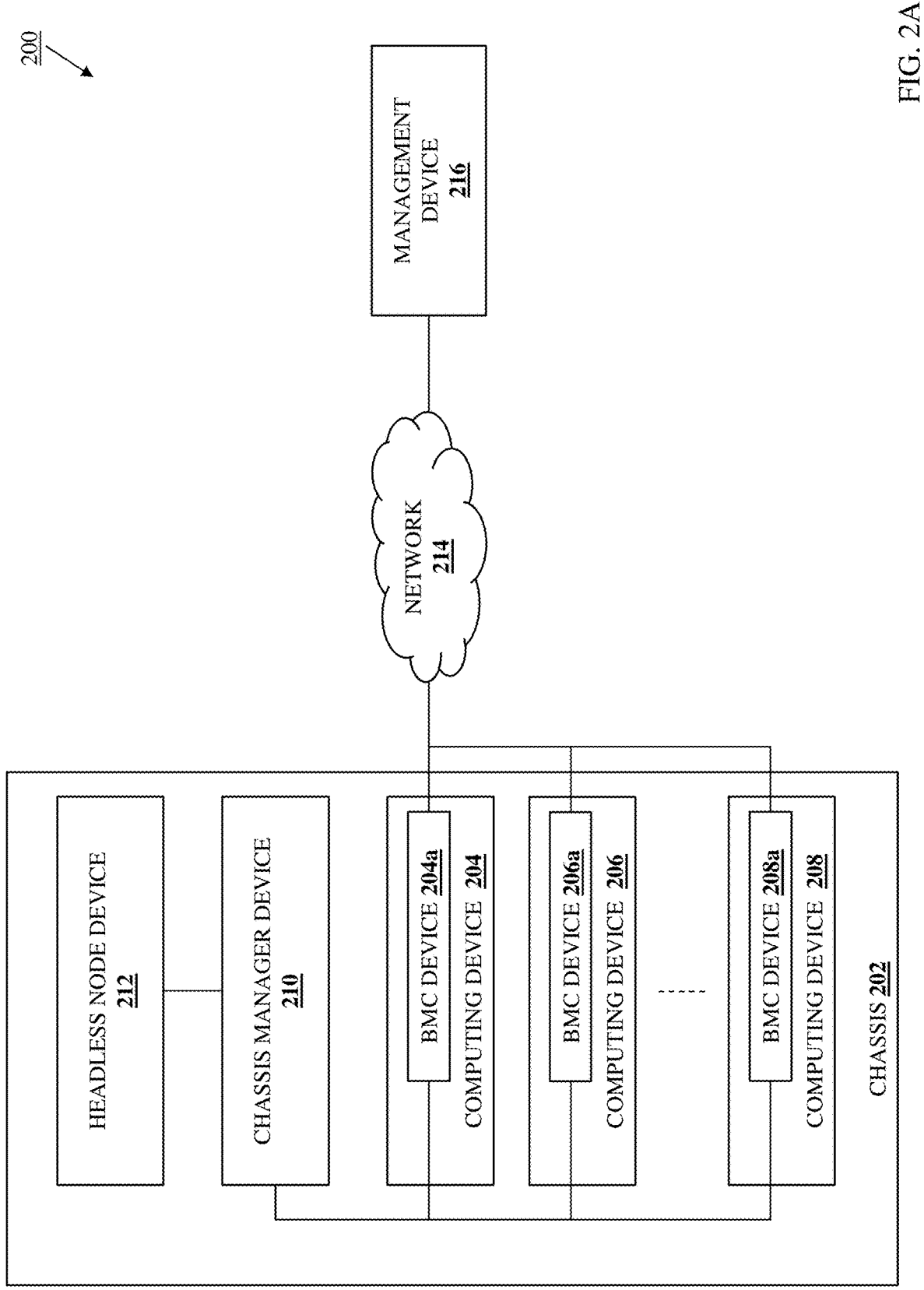
FIG. 2A is a schematic view illustrating an embodiment of a networked system that may include the headless node programming system of the present disclosure.
Figure 2B:
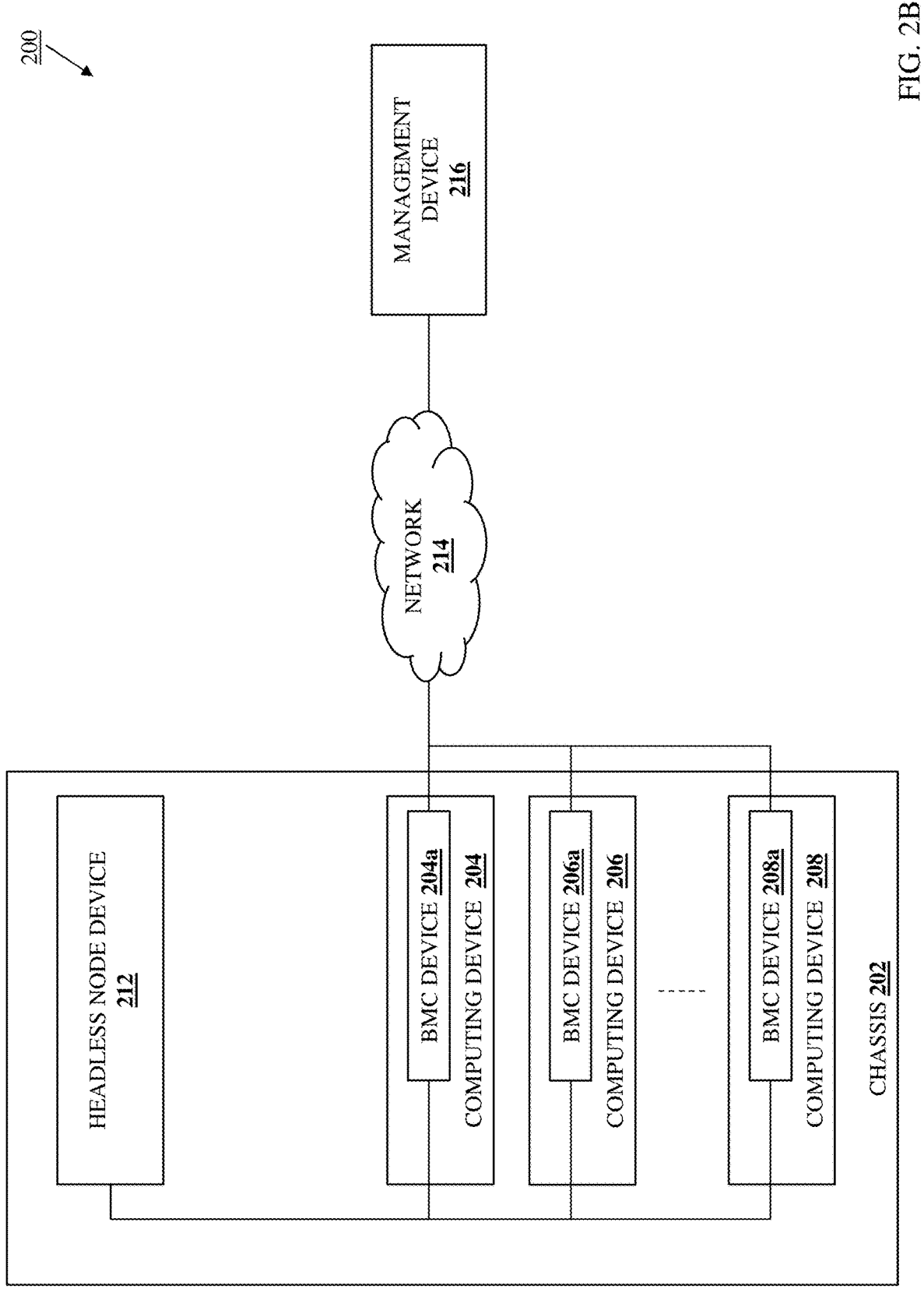
FIG. 2B is a schematic view illustrating an embodiment of a networked system that may include the headless node programming system of the present disclosure.

Referring now to FIGS. 2A and 2B, embodiments of a networked system 200 are illustrated that may include the headless node programming system of the present disclosure. In the illustrated embodiments, the networked system 200 includes a chassis 202 that houses the computing devices, chassis manager device, and headless node device discussed below, and one of skill in the art in possession of the present disclosure will appreciate how the chassis 202 may be configured to house switch devices and/or other networking devices known in the art, server devices and/or other computing devices known in the art, storage systems, and/or any other devices known in the art. Furthermore, while a multi-device chassis is illustrated, one of skill in the art in possession of the present disclosure will appreciate how the chassis 202 may be omitted in some embodiments while remaining within the scope of the present disclosure as well.

In the illustrated embodiments, the chassis 202 houses a plurality of computing devices 204, 206, and up to 208. In an embodiment, any or each of the computing device 204-208 may be provided by the IHS 100 discussed above with reference to FIG. 1, and/or may include some or all of the components of the IHS 100, and in specific examples may be provided by server devices. However, while illustrated and discussed as being provided by server devices, one of skill in the art in possession of the present disclosure will recognize that computing devices provided in the networked system 200 may include any devices that may be configured to operate similarly as any of the computing devices 204-208 discussed below.

As illustrated, each of the computing devices 204, 206, and up to 208 may include a respective Baseboard Management Controller (BMC) device 204a, 206a, and up to 208a, respectively, that may be provided by the integrated Remote Access Controller (iDRAC) included in server devices available from DELL® Inc. of Round Rock, Texas, United States, as well as any other BMC devices that would be apparent to one of skill in the art in possession of the present disclosure. As such, one of skill in the art in possession of the present disclosure will appreciate how each of the BMC devices 204a-208a may be configured to provide an out-of-band management platform that includes mostly separate resources from their respective computing device 204-208 that are configured to provide a browser-based interface or Command Line Interface (CLI) for managing and monitoring components in that computing device 204-208, respectively.

In the embodiment illustrated in FIG. 2A, the chassis 202 also houses an intermediary device that, in the specific examples described below, is provided by a chassis manager device 210 that is coupled to each of the BMC devices 204a-2048a in the computing devices 204-208, respectively, via an Inter-Integrated Circuit (12C) coupling or other BMC/chassis manager couplings know in the art. For example, the chassis manager device 210 may be provided by a Chassis Management Controller (CMC) in a POWER-EDGE® chassis available from DELL® Inc. of Round Rock, Texas, United States, and one of skill in the art in possession of the present disclosure will appreciate how the chassis manager device 210 may be configured to manage and monitor the overall health of the chassis (e.g., via inventory management, configuration, monitoring, remote power control of devices in the chassis, event alerts for devices and other components in the chassis, etc.). However, while a specific chassis manager device has been described, one of skill in the art in possession of the present disclosure will appreciate how other management devices and/or intermediary devices will fall within the scope of the present disclosure as well.

In the illustrated embodiments, the chassis 202 also houses a headless node device 212, which as described above is configured to operate without a monitor, keyboard, mouse (or virtual Keyboard/Video/Mouse (vKVM)), is not configured to output video, and otherwise does not include any front-end user/management interfaces that would allow direct human interaction with the headless node device 212. In the embodiment illustrated in FIG. 2A, the headless node device 212 is connected to the chassis manager device 210 to couple the headless node device 212 to the BMC devices 204a-208a, and one of skill in the art in possession of the present disclosure will appreciate how the BMC devices 204a-208a, the chassis manager device 210, and the headless node device 212 may be coupled together via restricted interfaces that enable communication with the headless node device 212 such as, for example, an I2C interface between the BMC devices 204a-208a and the chassis manager device 210, and an FPGA-based hardware control interface between the chassis manager device 210 and the headless node device 212.

In the embodiment illustrated in FIG. 2B, the headless node device 212 is connected directly to the BMC devices 204a-208a, and one of skill in the art in possession of the present disclosure will appreciate how the BMC devices 204a/208a and the headless node device 212 may be coupled together via restricted interfaces that enable communication with the headless node device 212 such as, for example, hardware- or software-based interfaces that may be restricted between the two (e.g., interfaces configured to have communications provided thereon appear as secured network communications that have been obfuscated, "hardened", and/or otherwise secured to enable configuration payload requests to be transmitted by the BMC devices 204a-208a to the headless node device 212). However, while only a single headless node device is illustrated and described in the examples below, one of skill in the art in possession of the present disclosure will appreciate how any number of headless node devices may be provided in the networked system 200 (e.g., included in the chassis 202) and utilized as described below while remaining within the scope of the present disclosure.

As illustrated, each of the BMC devices 204a-208a may be coupled to a network 214 that may include a Local Area Network (LAN), the Internet, combinations thereof, and/or any other network that would be apparent to one of skill in the art in possession of the present disclosure. Furthermore, a management device 216 is coupled to the network 214. In an embodiment, the management device 216 may be provided by the IHS 100 discussed above with reference to FIG. 1, and/or may include some or all of the components of the IHS 100, and in specific examples may be provided by desktop computing devices, laptop/notebook computing devices, tablet computing devices, mobile phones, and/or any other management devices that would be apparent to one of skill in the art in possession of the present disclosure. However, while illustrated and discussed as being provided by particular computing devices, one of skill in the art in possession of the present disclosure will recognize that management devices provided in the networked system 200 may include any devices that may be configured to operate similarly as any of the management device 216 discussed below. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Referring now to FIG. 3, an embodiment of a BMC device 300 is illustrated that may provide any or each of the BMC devices 204a-208a discussed above with reference to FIGS. 2A and 2B. As such, the BMC device 300 may be provided by the integrated Remote Access Controller (iDRAC) included in server devices available from DELL® Inc. of Round Rock, Texas, United States, as well as any other BMC devices that would be apparent to one of skill in the art in possession of the present disclosure. Furthermore, while illustrated and discussed as a BMC device, one of skill in the art in possession of the present disclosure will recognize that the functionality of the BMC device 300 discussed below may be provided by other devices that are configured to operate similarly as the BMC device 300 discussed below.

In the illustrated embodiment, the BMC device 300 includes a chassis 302 (e.g., a circuit board) that supports the components of the BMC device 300, only some of which are illustrated and described below. For example, the chassis 302 may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 304 that is configured to perform the functionality of the BMC engines and/or BMC devices discussed below.

The chassis 302 may also house a BMC storage system (not illustrated, but which may be similar to the storage 108 discussed above with reference to FIG. 1) that is coupled to the BMC engine 304 (e.g., via a coupling between the BMC storage system and the BMC processing system) and that includes a BMC database 306 that is configured to store any of the information utilized by the BMC engine 304 discussed below. The chassis 302 may also house a communication system 308 that is coupled to the BMC engine 304 (e.g., via a coupling between the communication system 308 and the BMC processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific BMC device 300 has been illustrated and described, one of skill in the art in possession of the present disclosure will recognize that BMC devices (or other devices operating according to the teachings of the present disclosure in a manner similar to that described below for the BMC device 300) may include a variety of components and/or component configurations for providing conventional BMC device functionality, as well as the headless node programming functionality discussed below, while remaining within the scope of the present disclosure as well.

Figure 4:
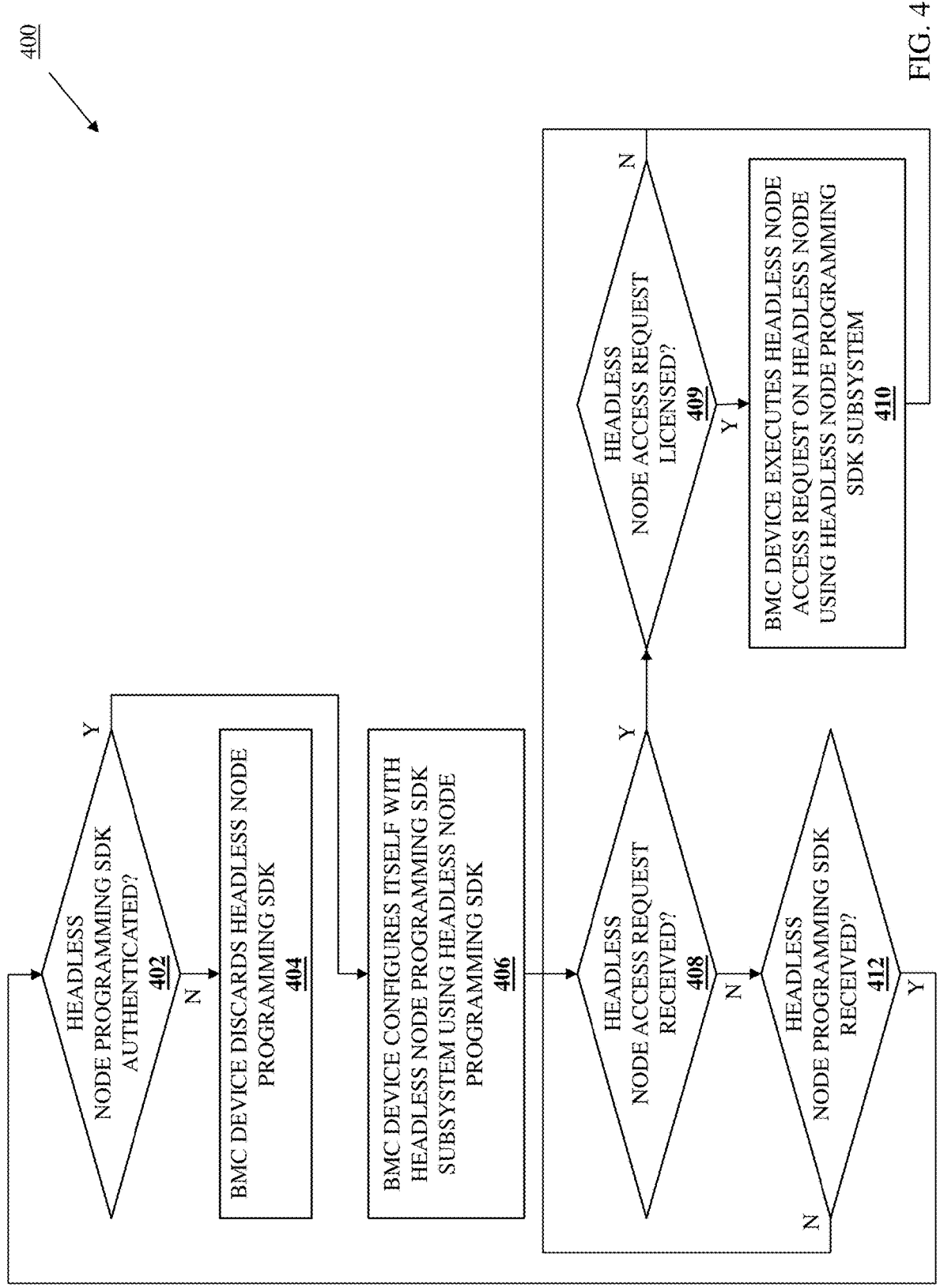
FIG. 4 is a flow chart illustrating an embodiment of a method for programming a headless node device.

Referring now to FIG. 4, an embodiment of a method 400 for programming a headless node device is illustrated. As discussed below, the systems and methods of the present disclosure provide a headless node programming SDK on a BMC device that the BMC device may authenticate and use to configure itself with a headless node programming SDK subsystem, and then use that headless node programming SDK subsystem to program a headless node device. For example, the headless node programming system of the present disclosure may include a Baseboard Management Controller (BMC) device that is coupled to a headless node device. The BMC device receives a first headless node programming Software Development Kit (SDK) and authenticates the first headless node programming SDK. In response to authenticating the first headless node programming SDK, the BMC device uses the headless node programming SDK to configure itself with a first headless node programming SDK subsystem. The BMC device then uses the first headless node programming SDK subsystem to program first data on the headless node device. As such, BMC devices that are prevented from using their IPMI-over-LAN interface may be configured to program headless node devices.

Figure 5A:
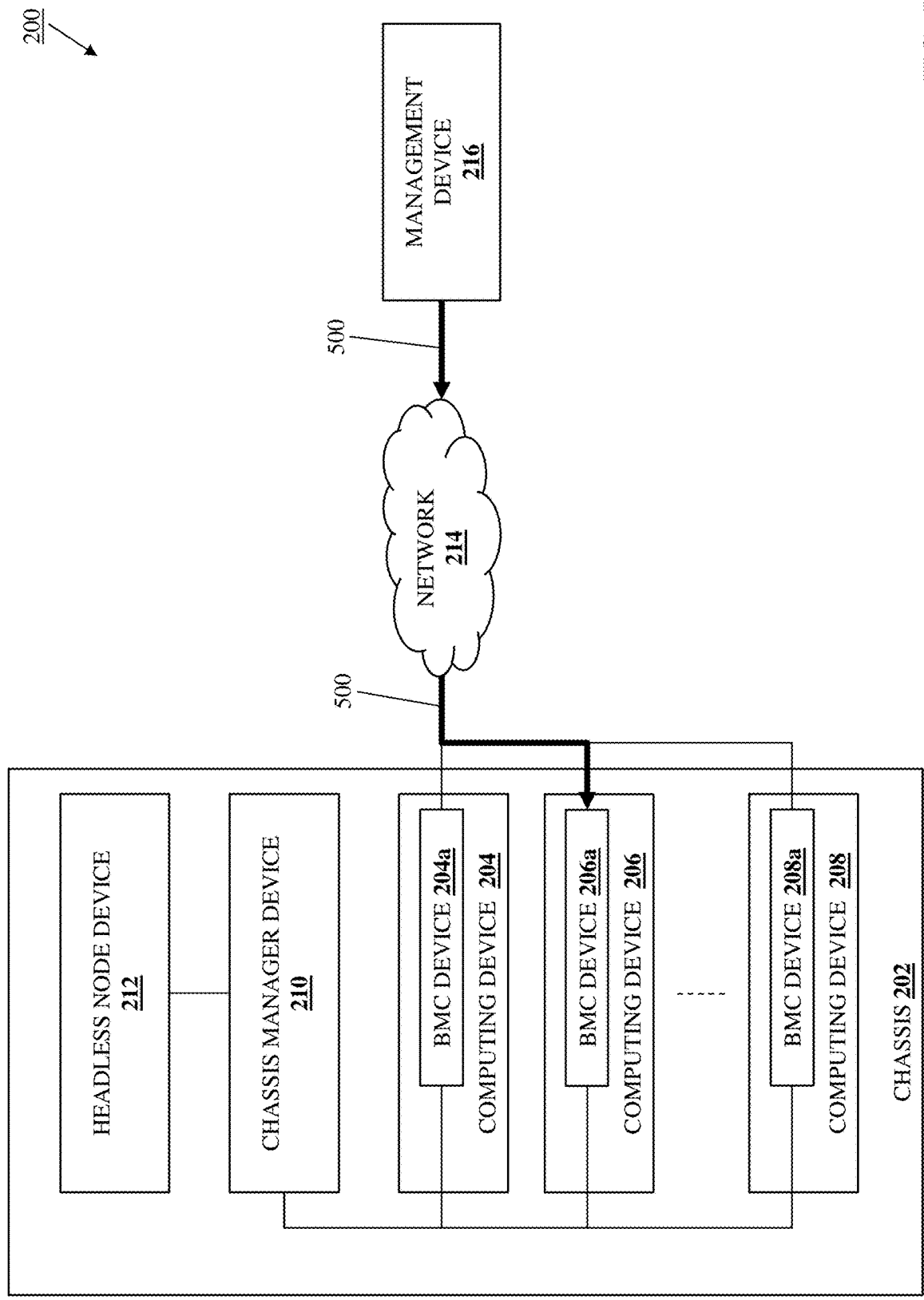
FIG. 5A is a schematic view illustrating an embodiment of the operation of the networked system of FIG. 2A during the method of FIG. 4.
Figure 5B:
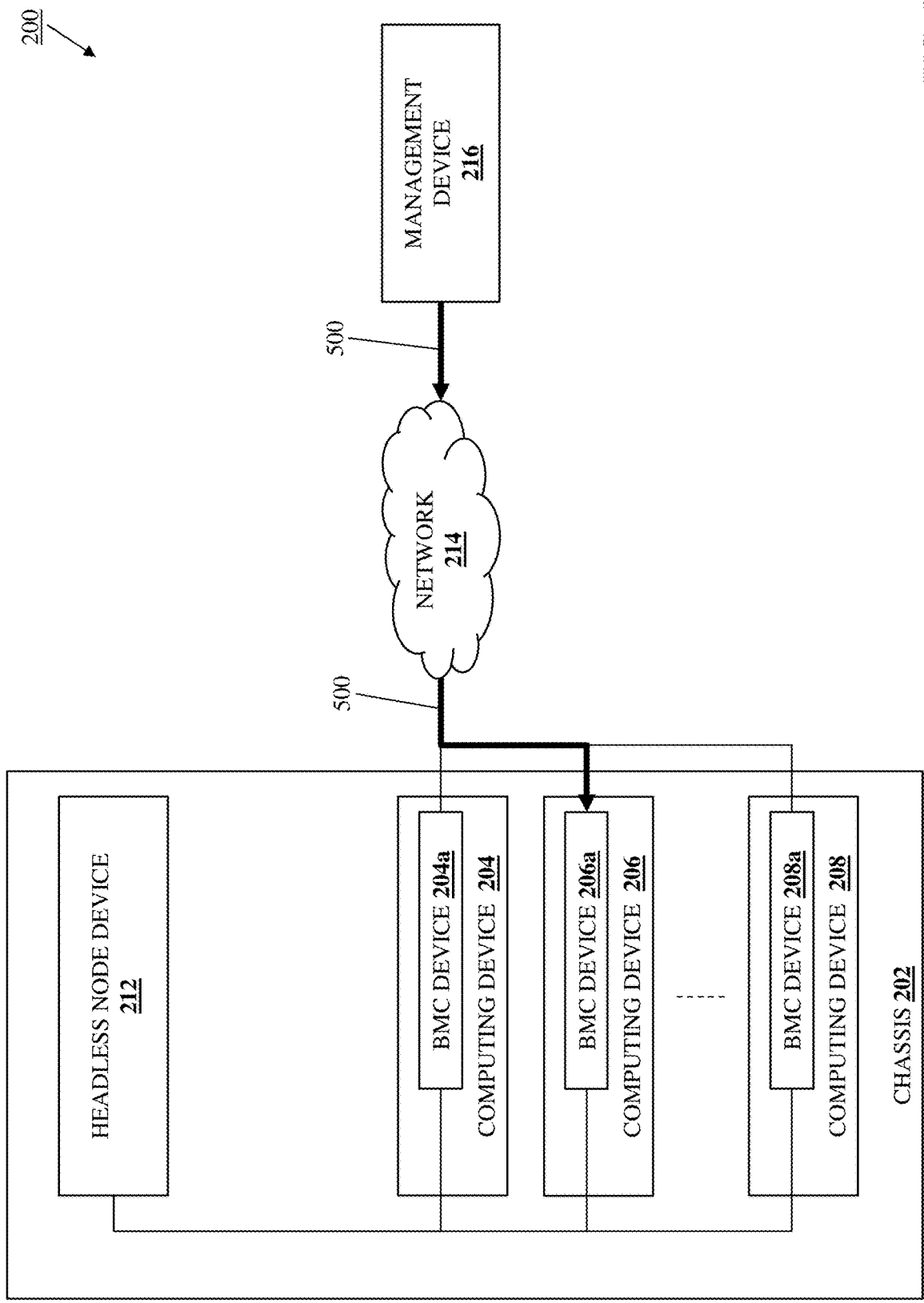
FIG. 5B is a schematic view illustrating an embodiment of the operation of the networked system of FIG. 2B during the method of FIG. 4.
Figure 5C:
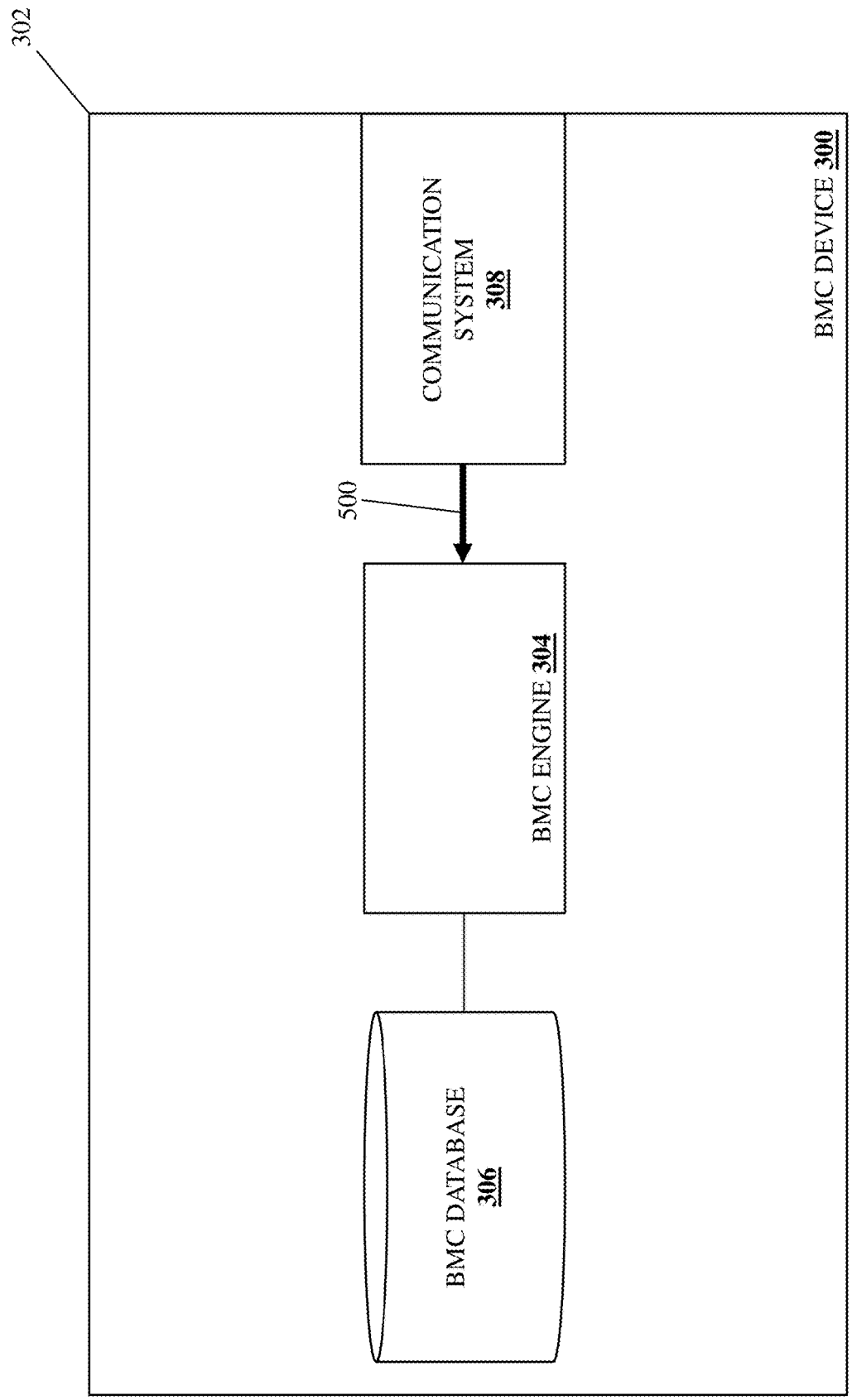
FIG. 5C is a schematic view illustrating an embodiment of the operation of the BMC device of FIG. 3 during the method of FIG. 4.

The method 400 begins at decision block 402 where the method 400 proceeds depending on whether a headless node programming SDK is authenticated. With reference to FIGS. 5A, 5B, and 5C, in embodiments of decision block 402, the management device 206 may perform headless node programming SDK provisioning operations 500 that may include generating and providing a headless node programming SDK via the network 314 and to a BMC device in any of the computing devices in the chassis 202, and thus while the BMC device 206a in the computing device 206 is illustrated and described below as receiving the headless node programming SDK, one of skill in the art in possession of the present disclosure will appreciate how any of the other BMC devices 204a and up to 208a may receive the headless node programming SDK at decision block 402 while remaining within the scope of the present disclosure as well. In an embodiment, the headless node programming SDK may be digitally signed by the headless node programming SDK provider in a manner that one of skill in the art in possession of the present disclosure will appreciate allows the origin of the headless node programming SDK to be verified (i.e., as the headless node programming SDK provider) using any of a variety of authentication techniques known in the art.

To provide a specific example, the management device 206 may generate an update package (e.g., a Dell Update Package (DUP) provided by DELL® Inc. of Round Rock, Texas, United States) that includes the headless node programming SDK, and then may digitally sign the update package with private key(s) that corresponds to public key(s) that are stored in the BMC device 206 (e.g., in the BMC database 306 in the specific examples below) and configured for use by the BMC device 206a in verifying the origin of the DUP. However, while specific examples of the authentication techniques used to secure the headless node programming SDK have been described, one of skill in the art in possession of the present disclosure will appreciate how any of a variety of authentication techniques may be used to secure the headless node programming SDK while remaining within the scope of the present disclosure as well.

As such, in some embodiments of decision block 402, the BMC engine 304 in the BMC device 206a/300 may receive the headless node programming SDK via its communication system 308 as part of the headless node programming SDK provisioning operations 500. However, while the BMC engine 304 in the BMC device 206a/300 is illustrated and described as receiving the headless node programming SDK from the management device 206 via the network 204, one of skill in the art in possession of the present disclosure will appreciate how the headless node programming SDK may be provided to the BMC engine 304 in a variety of manners that will fall within the scope of the present disclosure as well. For example, in other embodiments, the BMC device 206a/300 may be provided with the headless node programming SDK discussed above (e.g., in the BMC database 306) during its manufacture, as part of its provisioning in the computing device 206 during assembly or manufacture of the computing device 206, and/or in any other manners that would be apparent to one of skill in the art in possession of the present disclosure.

With reference to FIG. 6, in an embodiment of decision block 402, the BMC engine 304 in the BMC device 206/300 may perform headless node programming SDK authentication operations 600 that may include accessing authentication information in the BMC database 306 and using that authentication information to authenticate the headless node programming SDK (e.g., accessing public key(s) stored in the BMC database 306 and using those public key(s) to authenticate the DUP that includes the headless node programming SDK similarly as discussed above). As such, for a headless node programming SDK received via the network 204, the BMC engine 304 may authenticate that headless node programming SDK using authentication information stored in the BMC database 306, while for a headless node programming SDK stored in the BMC database 306, the BMC engine 304 may retrieve that headless node programming SDK from the BMC database 306 and then authenticate that headless node programming SDK using authentication information stored in the BMC database 306. However, while a few specific examples of headless node programming SDK authentication are illustrated and described, one of skill in the art in possession of the present disclosure will appreciate how the headless node programming SDK may be authenticated in a variety of manners that will fall within the scope of the present disclosure as well.

If, at decision block 402, the headless node programming SDK is not authenticated, the method 400 proceeds to block 404 where the BMC device discards the headless node programming SDK. In an embodiment, at block 404 and in response to a failure to authenticate the headless node programming SDK using the authentication information stored in the BMC database 306 (e.g., in response to the BMC engine 304 using the public key(s) stored in the BMC database 306 to determine that the DUP that includes the headless node programming SDK was not signed using corresponding private key(s)), the BMC engine 304 in the BMC device 206a may discard the headless node programming SDK, which one of skill in the art in possession of the present disclosure will appreciate may include any action by the BMC engine 304 that prevents the BMC engine 304 from configuring the BMC device 206a/300 with the headless node programming SDK sub-engine/subsystem described below. As such, following block 404, the BMC device 206a/300 in the computing device 206 will be unable to program the headless node device 212.

Figure 7:
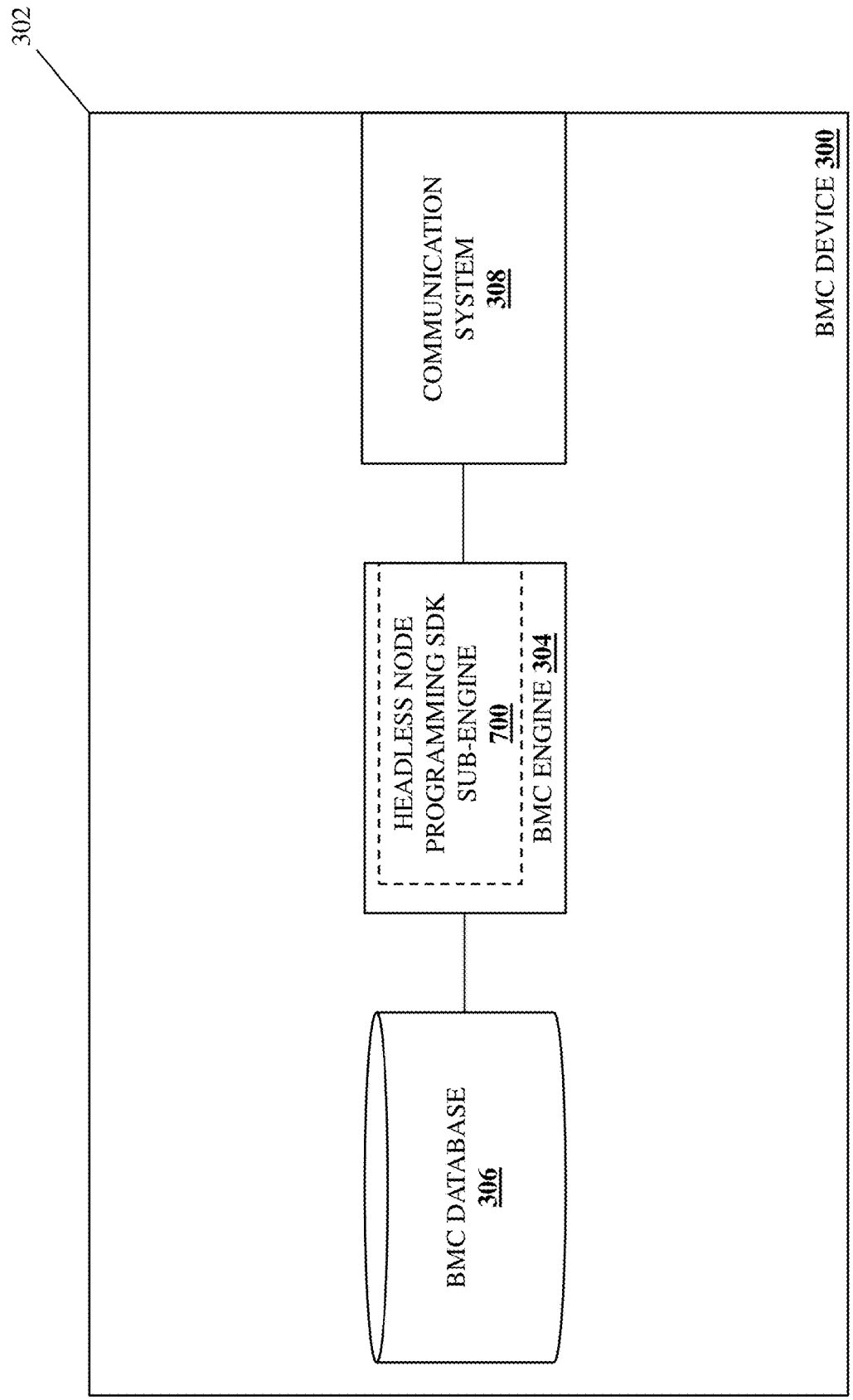
FIG. 7 is a schematic view illustrating an embodiment of the operation of the BMC device of FIG. 3 during the method of FIG. 4.

If, at decision block 402, the headless node programming SDK is authenticated, the method 400 proceeds to block 406 where the BMC device configures itself with a headless node programming SDK subsystem using the headless node programming SDK. With reference to FIG. 7, in an embodiment of block 406 and in response to authenticating the headless node programming SDK using the authentication information stored in the BMC database 306 (e.g., in response to the BMC engine 304 using the public key(s) stored in the BMC database 306 to verify that the DUP that includes the headless node programming SDK was signed using corresponding private key(s)), the BMC engine 304 in the BMC device 206a may use the headless node programming SDK to configure itself with a headless node programming SDK sub-engine 700 using any of a variety of SDK configuration techniques that would be apparent to one of skill in the art in possession of the present disclosure.

The method 400 then proceeds to decision block 408 where the method 400 proceeds depending on whether a headless node access request is received. As discussed below, with the BMC engine 304 on the BMC device 206/300 configured to use the headless node programming sub-engine 700 as described above, the management device 206 may generate and provide headless node access requests via the network 204 to the BMC engine 304 (via the headless node programming sub-engine 700) that may include headless node programming requests that include data to be programmed on the headless node device 212 and a request to program that data on the headless node device 212, headless node programming requests that include a request to erase data programmed on the headless node device 212 (e.g., a request to program "0's" in place of the current data programmed on the headless node device 212), headless node read requests that include a request to read data programmed on the headless node device 212 and transmit it back over the network 204 to the management device 206, and/or any other headless node access requests that would be apparent to one of skill in the art in possession of the present disclosure. As such, at decision block 408, the BMC engine 304 may use the headless node programming sub-engine 700 to monitor for any of a variety of headless node access requests that would be apparent to one of skill in the art in possession of the present disclosure.

Figure 8A:
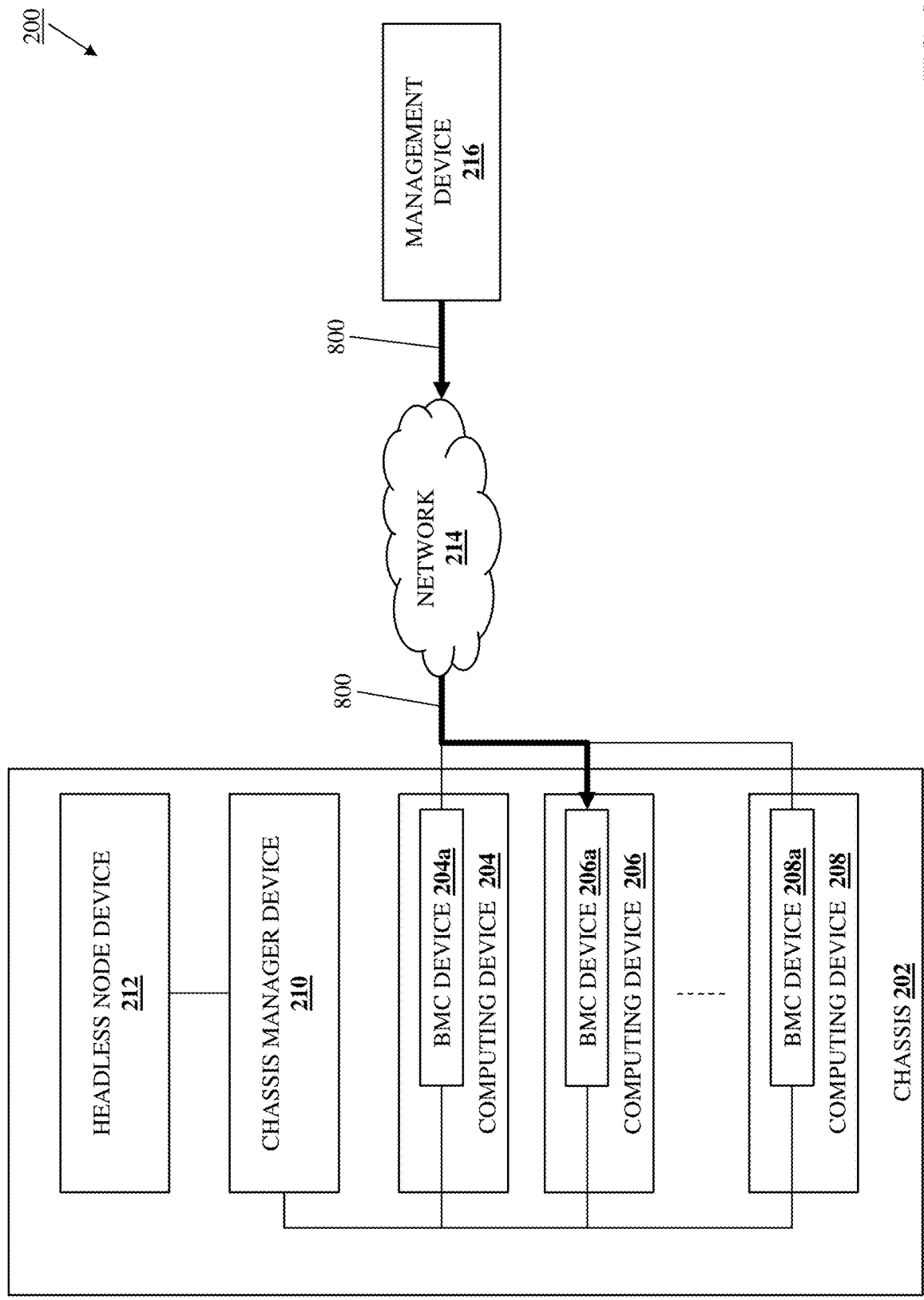
FIG. 8A is a schematic view illustrating an embodiment of the operation of the networked system of FIG. 2A during the method of FIG. 4.
Figure 8B:
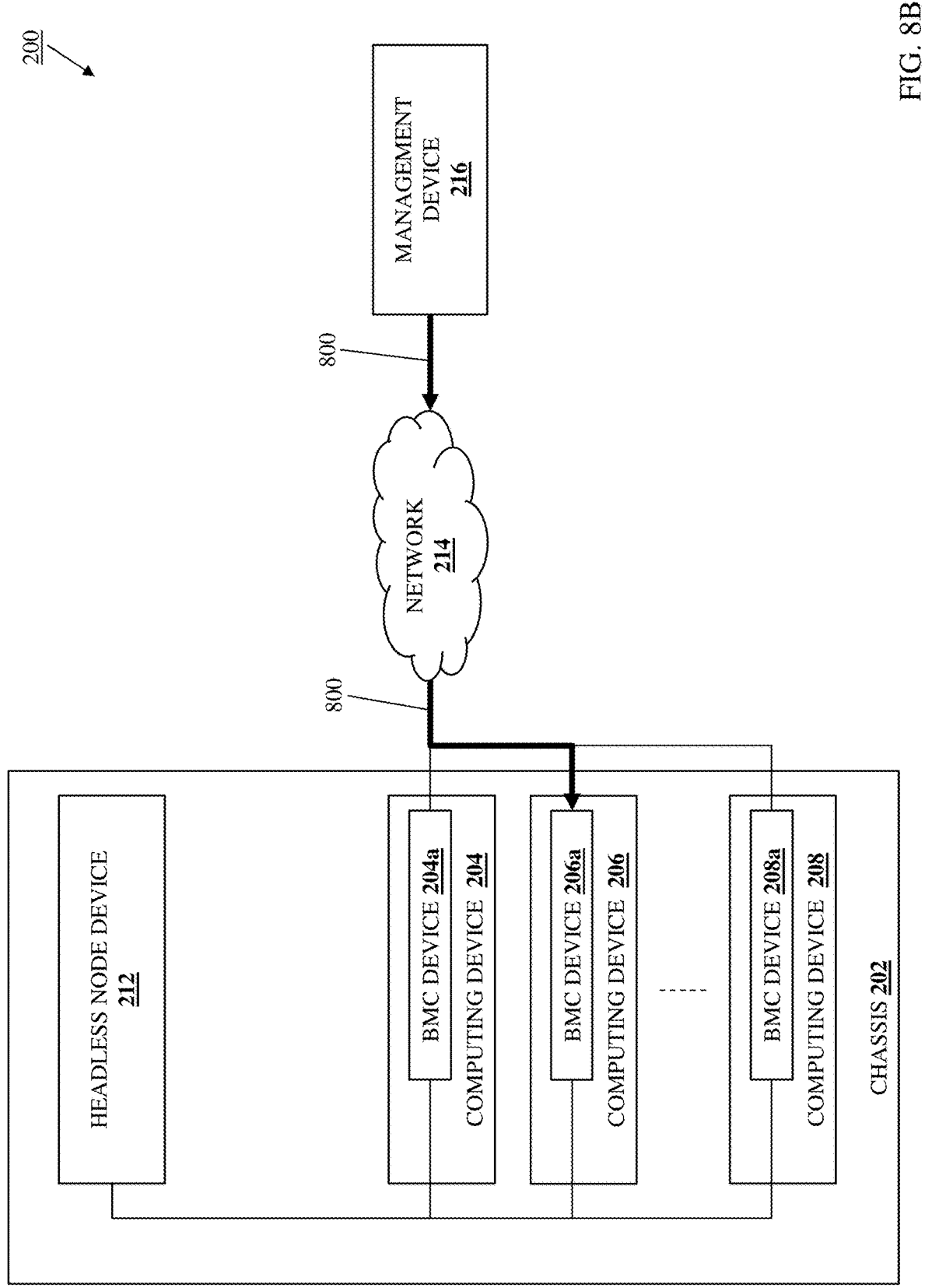
FIG. 8B is a schematic view illustrating an embodiment of the operation of the networked system of FIG. 2B during the method of FIG. 4.

If, at decision block 408, the headless node programming request is received, the method 400 proceeds to decision block 409 where the method 400 proceeds depending on whether the headless node access request is licensed. With reference to FIGS. 8A, 8B, and 8C, in embodiments of decision block 408, the management device 206 may perform headless node access request provisioning operations 800 that include generating and providing a headless node access request via the network 314 and to a BMC device in any of the computing devices in the chassis 202, and thus while the BMC device 206a in the computing device 206 is illustrated and described as receiving the headless node access request, one of skill in the art in possession of the present disclosure will appreciate how any of the other BMC devices 204a and up to 208a may receive the headless node access request at decision block 408 (after receiving the headless node programming SDK at decision block 402 and configuring itself with a corresponding headless node programming SDK sub-engine/subsystem at block 406) while remaining within the scope of the present disclosure as well. As such, in some embodiments of decision block 408, the BMC engine 304 in the BMC device 206a/300 may use the headless node programming sub-engine 700 to receive the headless node access request via its communication system 308.

However, while the BMC engine 304 in the BMC device 206a/300 is illustrated and described as using the headless node programming sub-engine 700 to receive the headless node access request from the management device 206 via the network 204, one of skill in the art in possession of the present disclosure will appreciate how the headless node access request may be provided to the BMC engine 304 (using the headless node programming sub-engine 700) in a variety of manners that will fall within the scope of the present disclosure as well. For example, in other embodiments, the BMC device 206a/300 may be provided with the headless node access request discussed above (e.g., in the BMC database 306) during its manufacture, as part of its assembly or manufacture in the computing device 206, and/or in any other manners that would be apparent to one of skill in the art in possession of the present disclosure.

For example, some embodiments of the present disclosure may provide the headless node programming SDK discussed above with a headless node access request that includes data that is to be programmed on the headless node device 212, and thus the configuration of the BMC engine 304 with the headless node programming SDK sub-engine 700 may include extracting that headless node access request from the headless node programming SDK (or the DUP discussed above) and providing that headless node access request to the BMC engine 304 (via the headless node programming SDK sub-engine 700) while remaining within the scope of the present disclosure as well.

Figure 9:
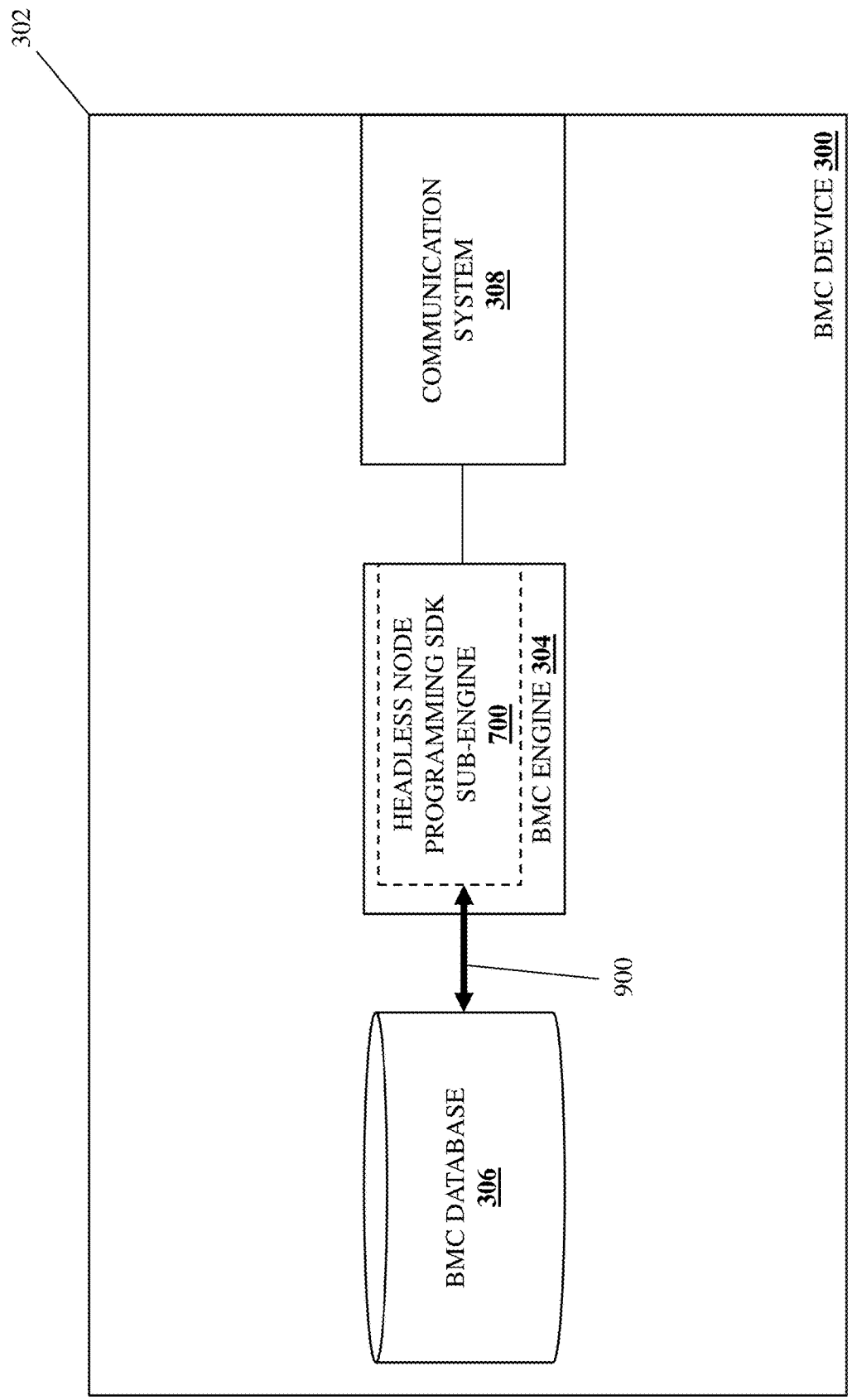
FIG. 9 is a schematic view illustrating an embodiment of the operation of the BMC device of FIG. 3 during the method of FIG. 4.

With reference to FIG. 9, in an embodiment of block 409, the BMC engine 304 in the BMC device 206/300 may perform headless node access request licensing check operations 900 that may include accessing licensing information in the BMC database 306 and using that licensing information to determine whether the headless node programming SDK sub-engine 700 is licensed to execute the headless node access request received at decision block 408. As described in further detail below, the BMC engine 304 in the BMC device 206a/300 may require licenses to use the headless node programming SDK sub-engine 700 to perform different headless node access operations, with the specific examples provided below including a license to program data on the headless node device 212 once, a license to program data on the headless node device 212 multiple times, and a license to read data from the headless node device 212. However while a few specific examples are provided, one of skill in the art in possession of the present disclosure will appreciate how any of a variety of headless node access operations may be subject to a license while remaining within the scope of the present disclosure as well.

Figure 10:
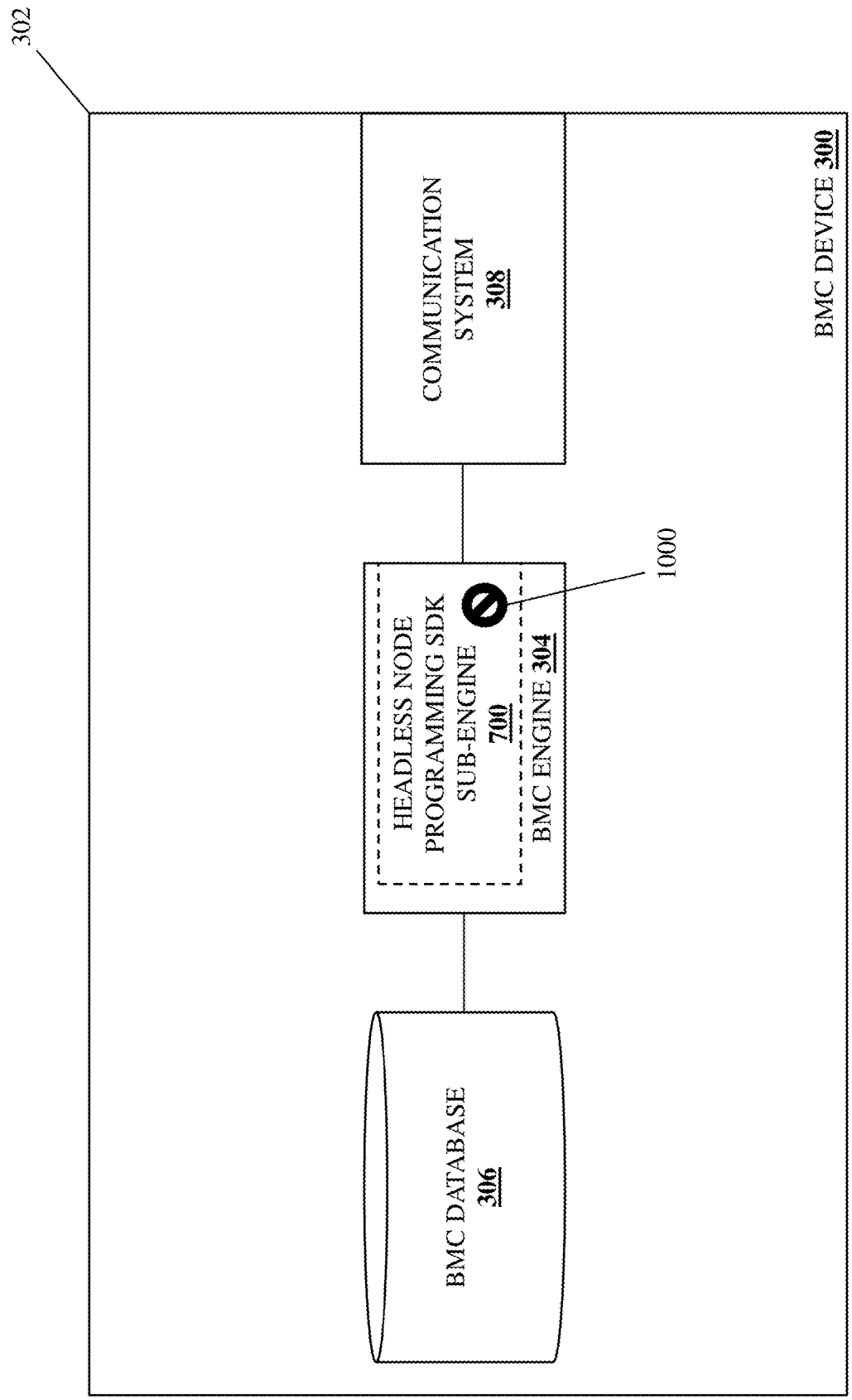
FIG. 10 is a schematic view illustrating an embodiment of the operation of the BMC device of FIG. 3 during the method of FIG. 4.

If, at decision block 409, the headless node access request is not licensed, the method returns to decision block 408. For example, with reference to FIG. 10, an embodiment is illustrated in which the BMC engine 304 in the BMC device 206a/300 determines that the headless node programming SDK sub-engine 700 is not licensed to perform the headless node access request received at decision block 409, and thus the headless node access request received at decision block 408 is denied or otherwise not executed (as illustrated by element 1000 in FIG. 10). To provide a specific example, the headless node programming SDK sub-engine 700 may be an initial headless node programming SDK sub-engine configured for use by the BMC engine 304, and may not be licensed to perform any headless node access requests on the headless node device 212, but rather may be configured for use by the BMC engine 304 in order to allow subsequent headless node programming SDK sub-engines that are licensed to perform headless node access request(s) to be configured for use by the BMC engine 304, described in further detail below.

Figure 11A:
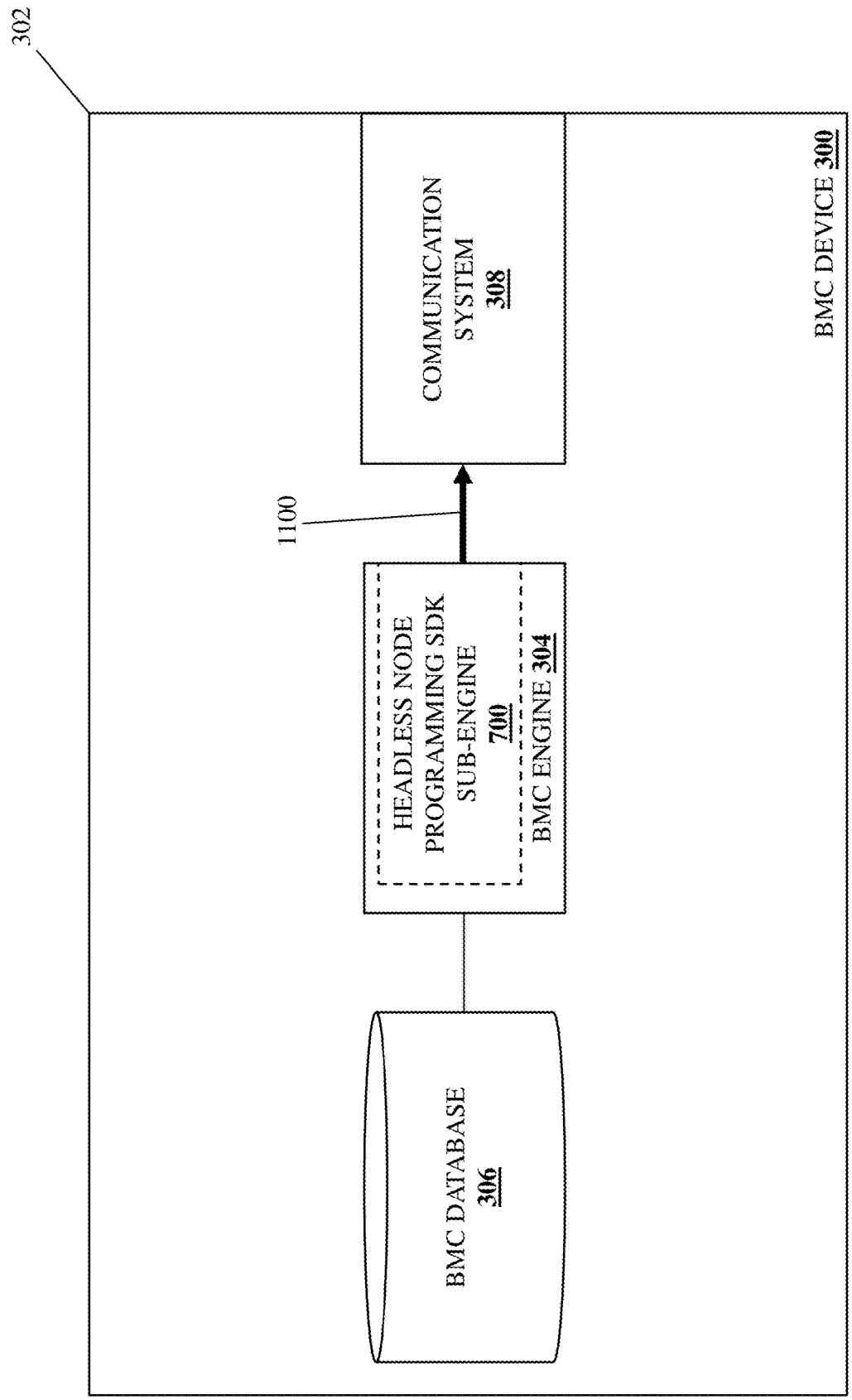
FIG. 11A is a schematic view illustrating an embodiment of the operation of the BMC device of FIG. 3 during the method of FIG. 4.
Figure 11B:
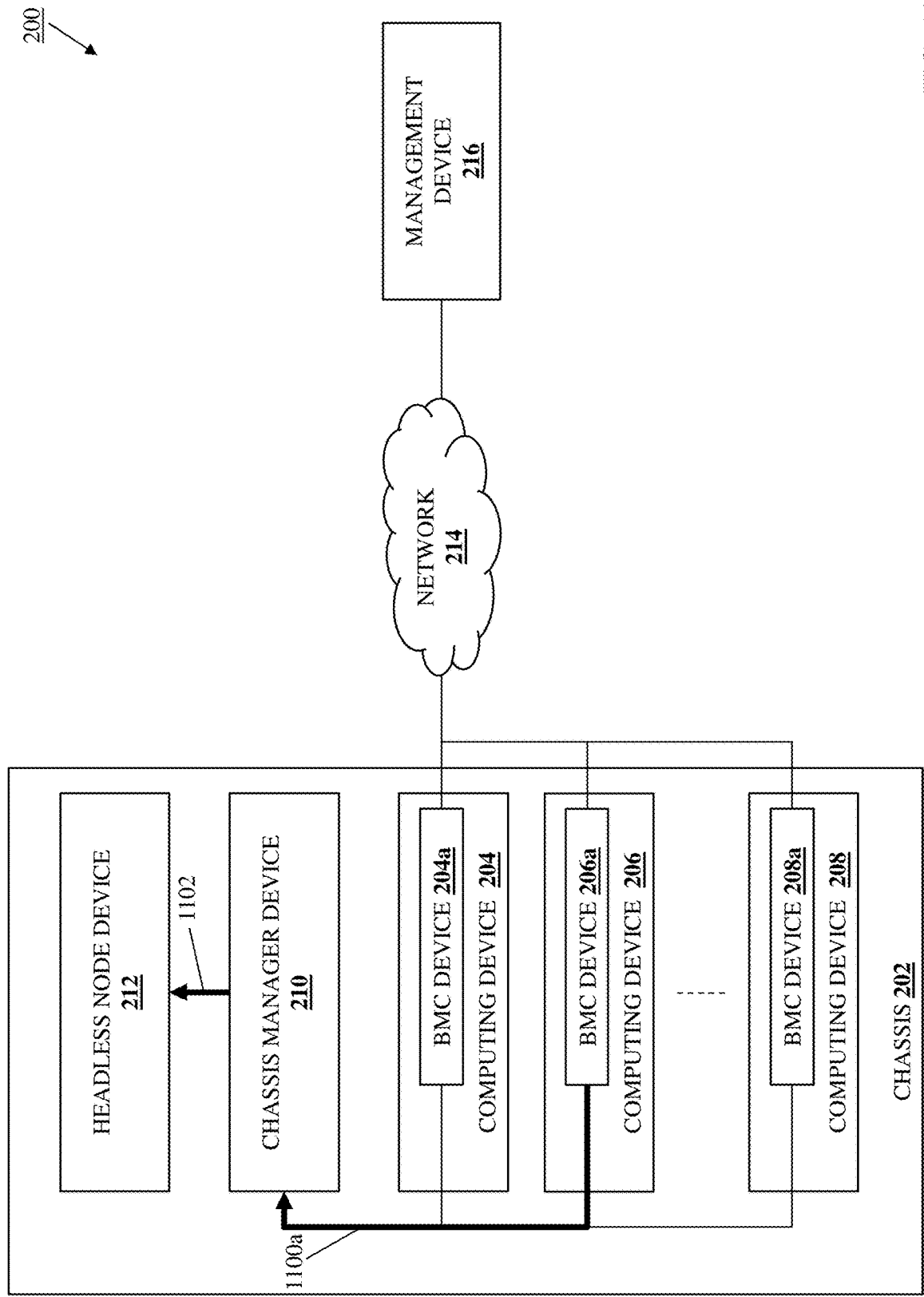
FIG. 11B is a schematic view illustrating an embodiment of the operation of the networked system of FIG. 2A during the method of FIG. 4.
Figure 11C:
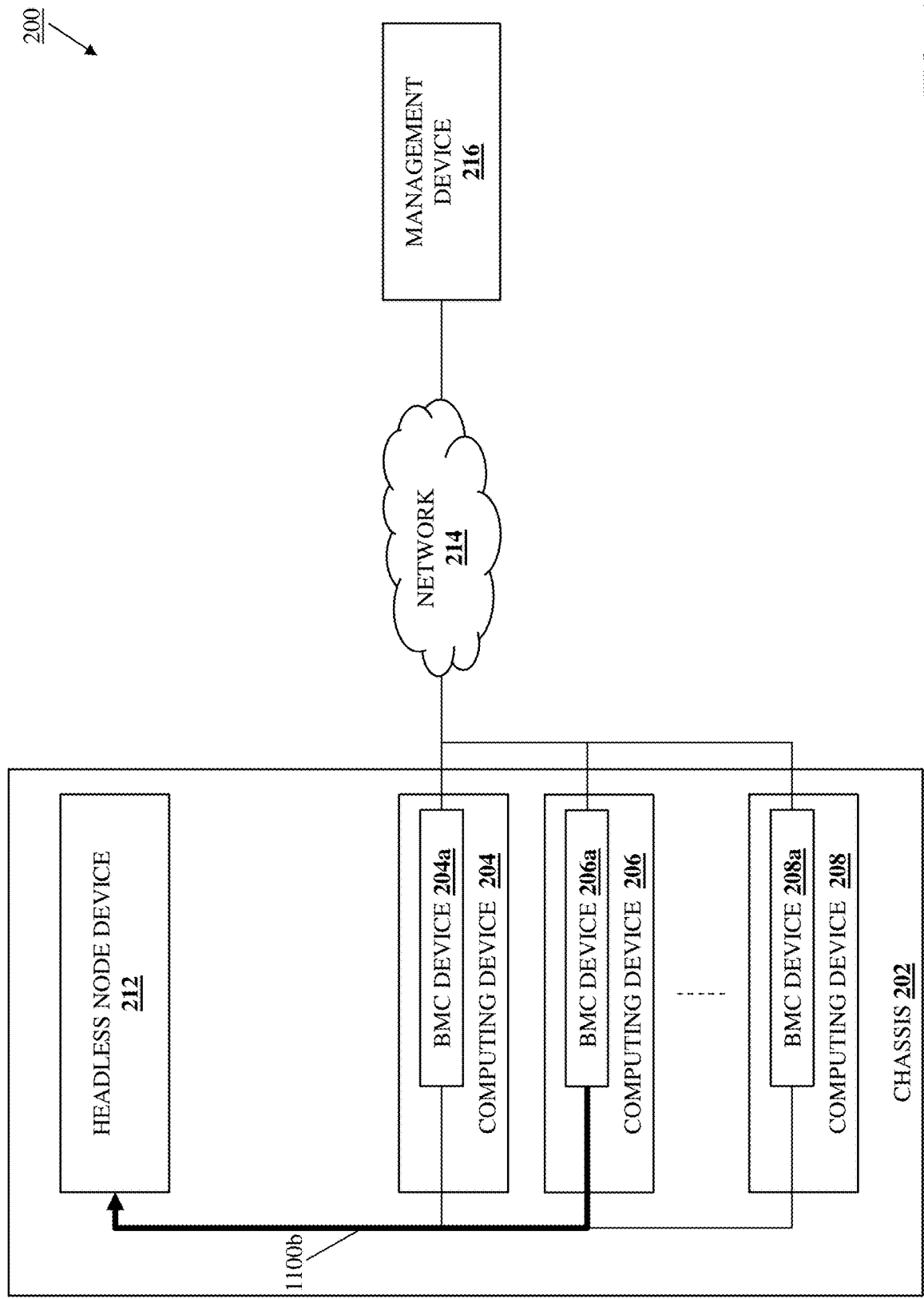
FIG. 11C is a schematic view illustrating an embodiment of the operation of the networked system of FIG. 2B during the method of FIG. 4.

If, at decision block 409, the headless node access request is licensed, the method 400 proceeds to block 410 where the BMC device executes the headless node programming request on a headless node using the headless node programming SDK subsystem. With reference to FIGS. 11A, 11B, and 11C, an embodiment is illustrated in which the BMC engine 304 in the BMC device 206a/300 determines at decision block 409 that the headless node programming SDK sub-engine 700 is licensed to perform the headless node access request (received at decision block 408) that provides a headless node programming request to write data to the headless node device 212 in this specific example. In response to determining that the headless node programming SDK sub-engine 700 is licensed to perform the headless node programming request, the BMC engine 304 may use the headless node programming SDK sub-engine 700 to perform programming operations 1100 that include providing the data that was included in the headless node programming request via its communication system 308 and to the headless node device 212. For example, with reference to FIG. 11B, the programming operations 1100 may include chassis manager device data transmission operations 1100a that include the BMC device 206a/300 transmitting the data that was included in the headless node programming request to the chassis manager device 210 to cause the chassis manager device 210 to perform data write operations 1102 that include writing that data (e.g., a "service tag" or other identifier for the headless node device 212, "branding" information for the headless node device 212, etc.) to a memory device, storage device, and/or other data storage element in the headless node device 212.

In another example, with reference to FIG. 11C, the programming operations 1100 may include data write operations 1100b that include the BMC device 206a/300 using the headless node programming SDK sub-engine 700 to write the data that was included in the headless node programming request (e.g., a "service tag" or other identifier for the headless node device 212, "branding" information for the headless node device 212, etc.) to a memory device, storage device, and/or other data storage element in the headless node device 212. Furthermore, while not illustrated or described in detail, the headless node access request received at decision block 408 may provide a headless node programming request to erase data from the headless node device 212, and in response to determining that the headless node programming SDK sub-engine 700 is licensed to perform that headless node programming request, the BMC engine 304 in the BMC device 206a/300 may use the headless node programming SDK sub-engine 700 to perform similarly as illustrated and described with reference to FIGS. 11A-11C to write "0's" to (i.e., "erase" the data stored on) the memory device, storage device, and/or other data storage element in the headless node device 212.

Figure 12B:
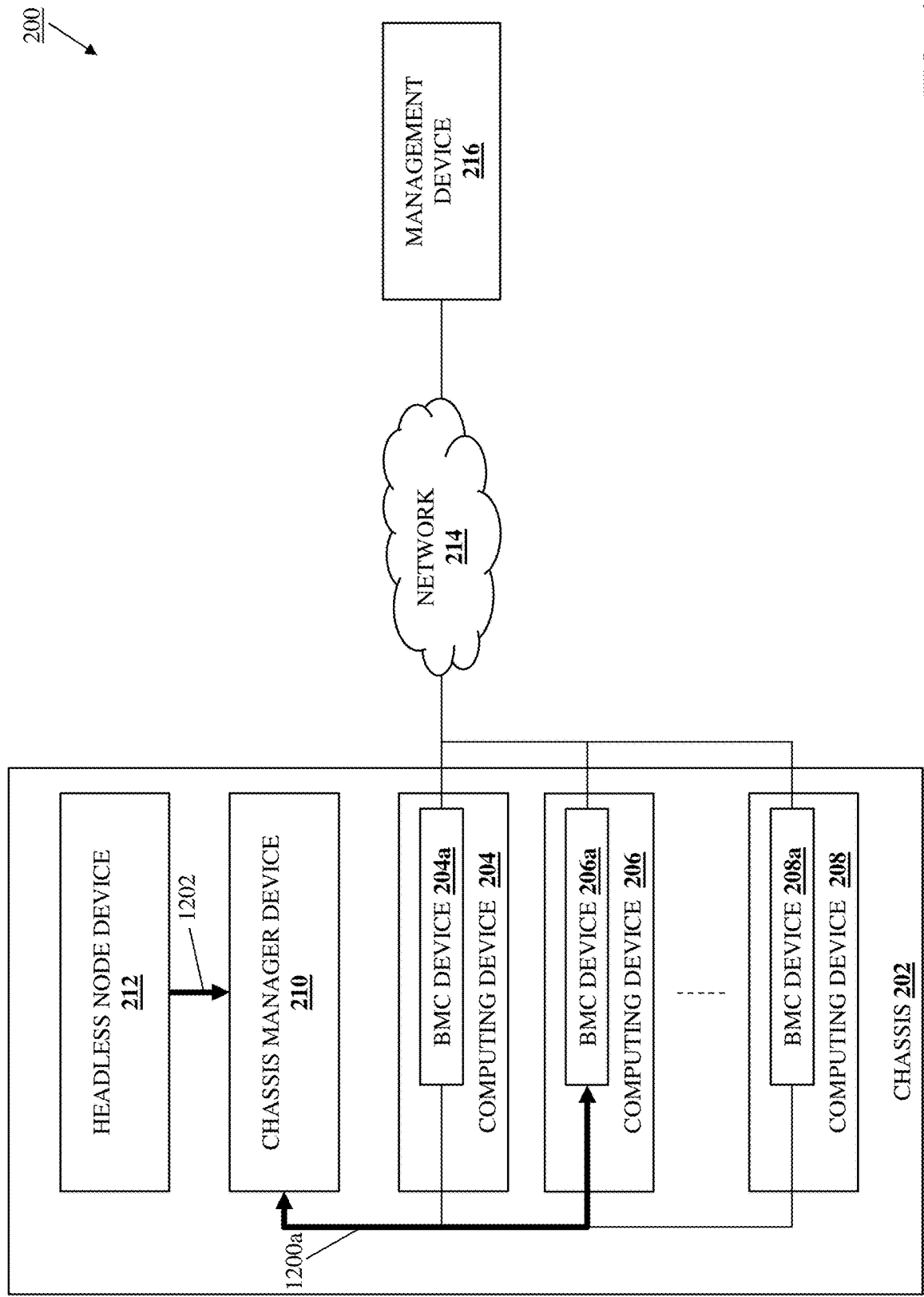
FIG. 12B is a schematic view illustrating an embodiment of the operation of the networked system of FIG. 2A during the method of FIG. 4.
Figure 12C:
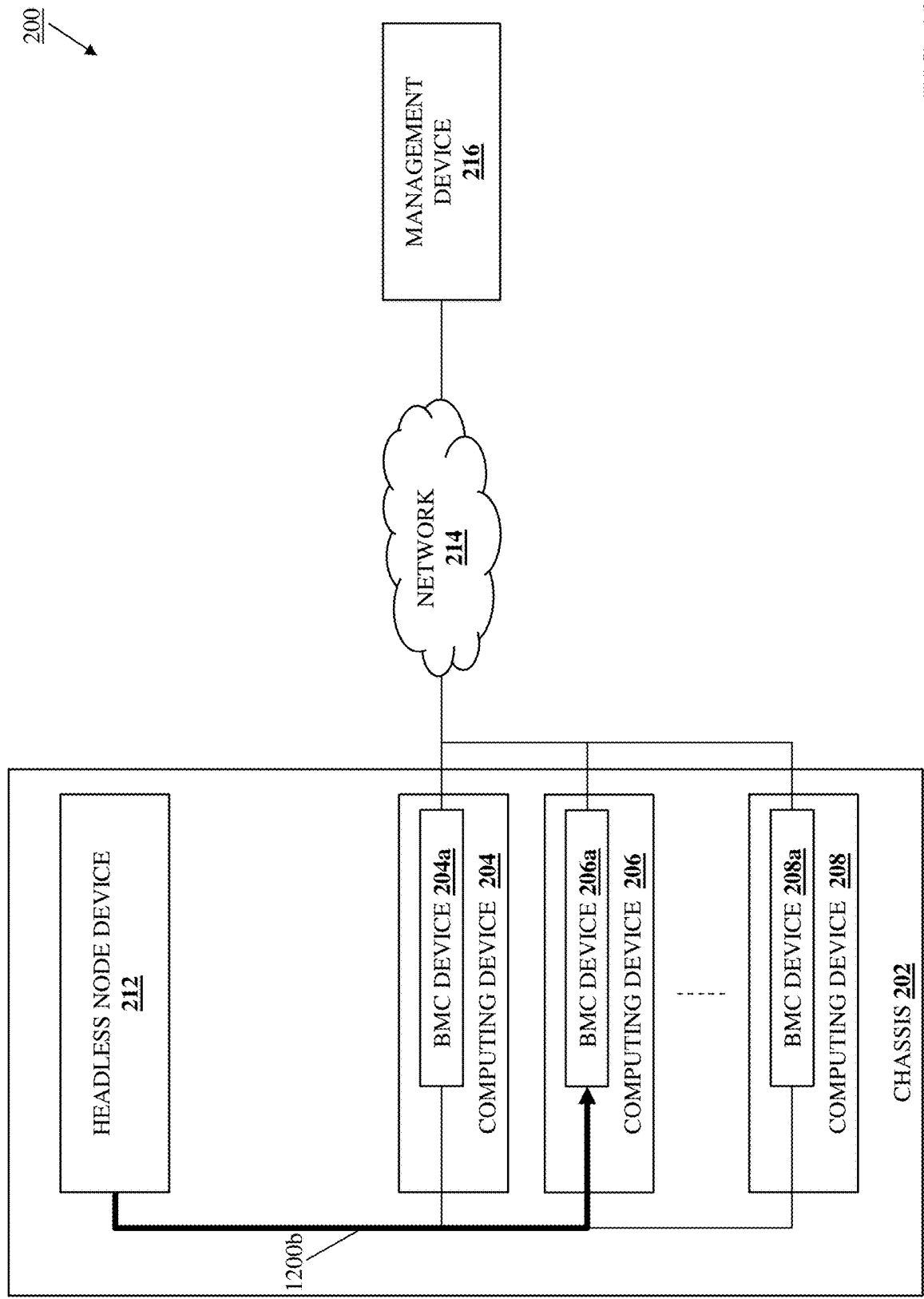
FIG. 12C is a schematic view illustrating an embodiment of the operation of the networked system of FIG. 2B during the method of FIG. 4.

With reference to FIGS. 12A, 12B, and 12C, an embodiment is illustrated in which the BMC engine 304 in the BMC device 206a/300 determines at decision block 409 that the headless node programming SDK sub-engine 700 is licensed to perform the headless node access request (received at decision block 408) that provides a headless node read request to read data from the headless node device 212 in this specific example. In response to determining that the headless node programming SDK sub-engine 700 is licensed to perform the headless node read request, the BMC engine 304 may use the headless node programming SDK sub-engine 700 to perform read operations 1200 that include reading data identified in the headless node programming request via its communication system 308 and from the headless node device 212 (e.g., a "service tag" or other identifier for the headless node device 212, "branding" information for the headless node device 212, etc.). For example, with reference to FIG. 12B, the read operations 1200 may include the BMC engine 304 (using the headless node programming SDK sub-engine 700) and the chassis manager device 210 performing data retrieval operations 1200a to cause the chassis manager data to perform read operations 1202 that include reading data (e.g., a "service tag" or other identifier for the headless node device 212, "branding" information for the headless node device 212, etc.) from a memory device, storage device, and/or other data storage element in the headless node device 212, with the data retrieval operations 1200a including the chassis manager device 210 providing that data to the BMC engine 304 in the BMC device 206a/300 (using the headless node programming SDK sub-engine 700).

Figure 12D:
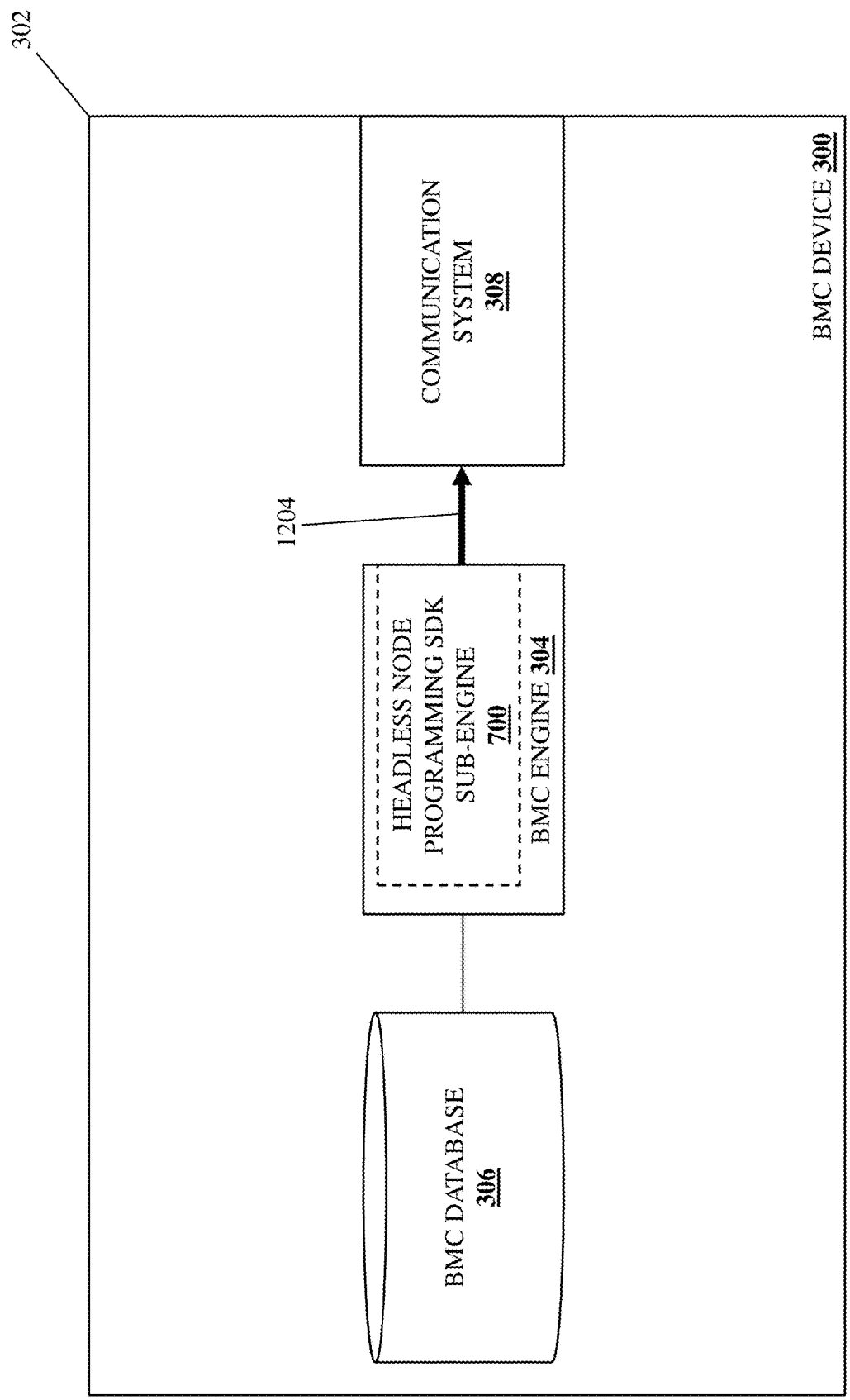
FIG. 12D is a schematic view illustrating an embodiment of the operation of the BMC device of FIG. 3 during the method of FIG. 4.
Figure 12F:
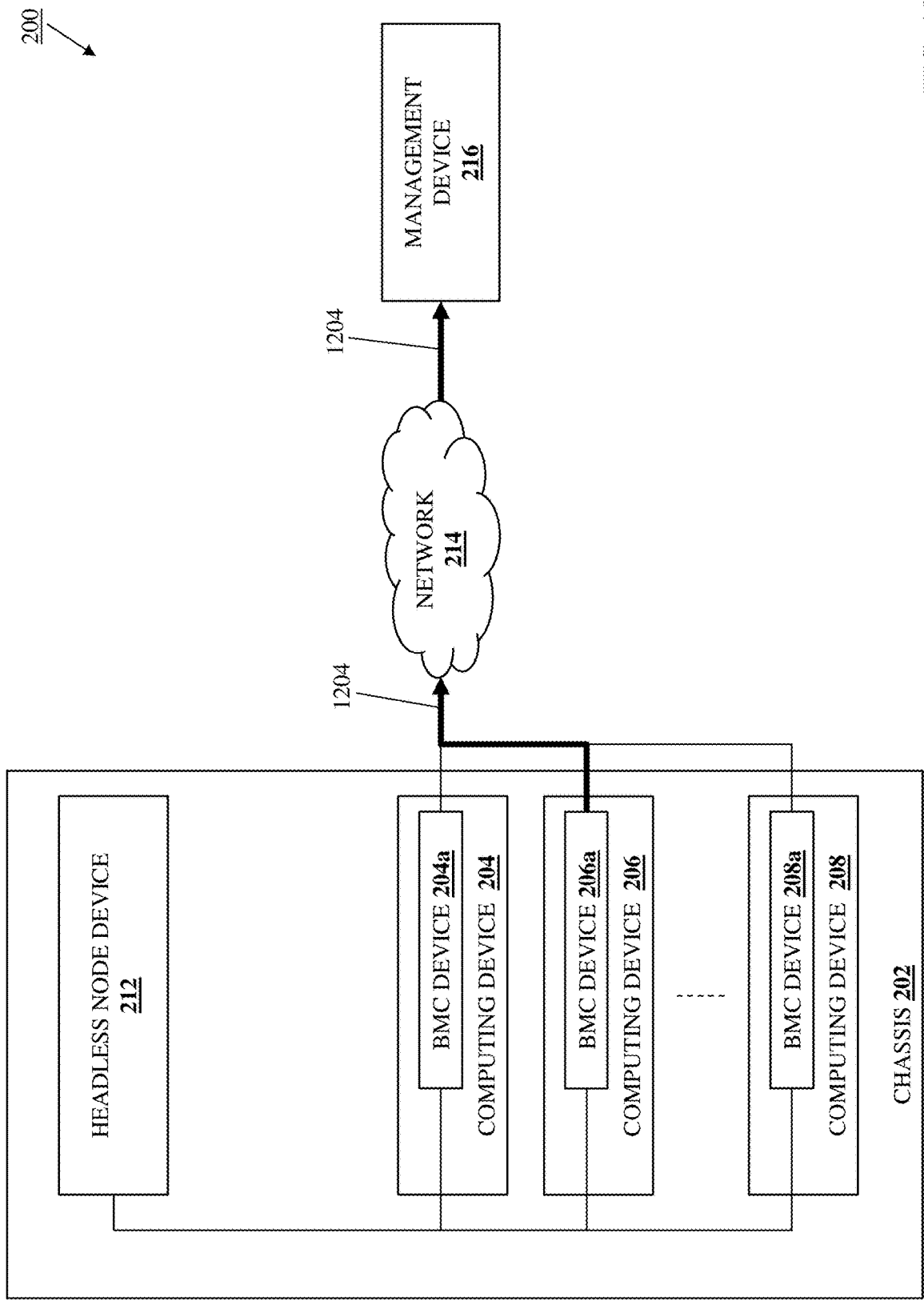
FIG. 12F is a schematic view illustrating an embodiment of the operation of the networked system of FIG. 2B during the method of FIG. 4.

In another example, with reference to FIG. 12C, the read operations 1200 may include read operations 1200b that include the BMC device 206a/300 using the headless node programming SDK sub-engine 700 to read the data identified in the headless node programming request (e.g., a "service tag" or other identifier for the headless node device 212, "branding" information for the headless node device 212, etc.) from a memory device, storage device, and/or other data storage element in the headless node device 212. With reference to FIGS. 12D, 12E, and 12F, the BMC engine 304 in the BMC device 300 may then use the headless node programming SDK sub-engine 700 to perform data provisioning operations 1204 that include transmitting the data read from the headless node device 212 using its communication system 308 and via the network 214 to the management device 216.

The method 400 then returns to decision block 408. As such, the method 400 may loop such that the BMC engine 304 in the BMC device 300 uses the headless node programming SDK sub-engine 700 to execute headless node access requests on the headless node when headless node requests are received. As discussed above, in some embodiments the BMC device 206/300 may be provided with a license to program data on the headless node device 212 once, and thus following a first performance of block 410 during a first iteration of the method 400, any subsequent headless node access request received at decision block 408 during a subsequent iteration of the method 400 that requests the programming of data on the headless node device 212 will result in the BMC engine determining that the headless node programming SDK sub-engine 700 is not licensed to execute that headless node access request at decision block 409 in that subsequent iteration and thus discarding that headless node access request. As such, one of skill in the art in possession of the present disclosure will appreciate how such embodiments may include the BMC engine 304 tracking performance of headless node access requests for purposes of making the licensing determinations discussed above.

As such, some embodiments of the present disclosure may utilize a headless node programming SDK to configure the BMC engine on a BMC device to use a headless node programming SDK sub-engine, and that headless node programming SDK sub-engine may not be licensed to execute headless node access requests, may be licensed to perform headless access requests once (or some limited number of times), or may be licensed to perform unlimited headless node access requests. However, rather than (or in addition to) using the same headless node programming SDK sub-engine provided by a particular headless node programming SDK to execute headless node access requests, BMC engines in BMC devices of the present disclosure may utilize different headless node programming SDKs providing different headless node programming SDK sub-engines to perform headless node access requests, an example of which is described below.

For example, if at decision block 408 the headless node programming request is not received, the method 400 proceeds to decision block 410 where the method 400 proceeds depending on whether a headless node programming SDK is received. As noted above and discussed in further detail below, "new" headless node programming SDKs may be provided to the BMC device 206/300 to configure it to execute headless node access requests on the headless node device 212, and those headless node access requests may be provided with (or subsequent to) the use of those "new" headless node programming SDKs to configure the BMC device 206/300 to program the headless node device 212. If, at decision block 412, the headless node programming SDK is not received, the method 400 returns to decision block 408. As such, the method 400 may loop until either a headless node access request is received, or a headless node programming SDK is received.

If, at decision block 412, the headless node programming SDK is received, the method 400 returns to decision block 402. As such, the method 400 may loop such that, when a headless node programming SDK is received, that headless node programming SDK may be authenticated and used to configure the BMC engine in the BMC device with its headless node programming SDK sub-engine/subsystem that may allow that BMC engine to perform headless node access requests (if licensed to do so).

Figure 13B:
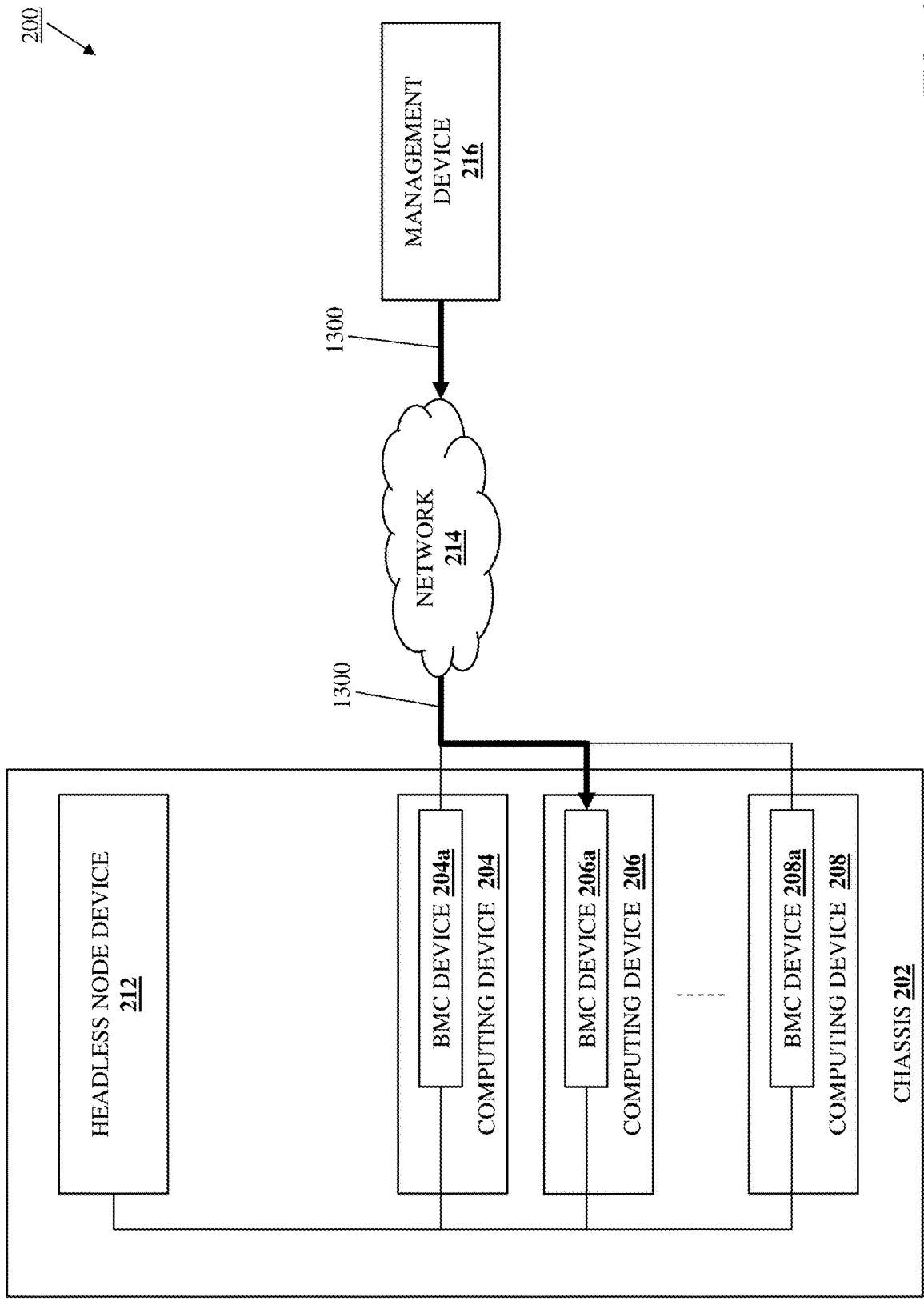
FIG. 13B is a schematic view illustrating an embodiment of the operation of the networked system of FIG. 2B during the method of FIG. 4.

With reference to FIGS. 13A, 13B, and 13C, in embodiments of decision block 412, the management device 206 may perform headless node programming SDK provisioning operations 1300 that may include generating and providing a headless node programming SDK via the network 314 and to the BMC device 206a in the computing device similarly as described above. Also similarly as described above, the headless node programming SDK may be digitally signed by the headless node programming SDK provider in a manner that allows the origin of the headless node programming SDK to be verified (i.e., as the headless node programming SDK provider). As such, in some embodiments of decision block 412, the BMC engine 304 in the BMC device 206a/300 may receive the headless node programming SDK via its communication system 308 as part of the headless node programming SDK provisioning operations 1300.

Figure 14:
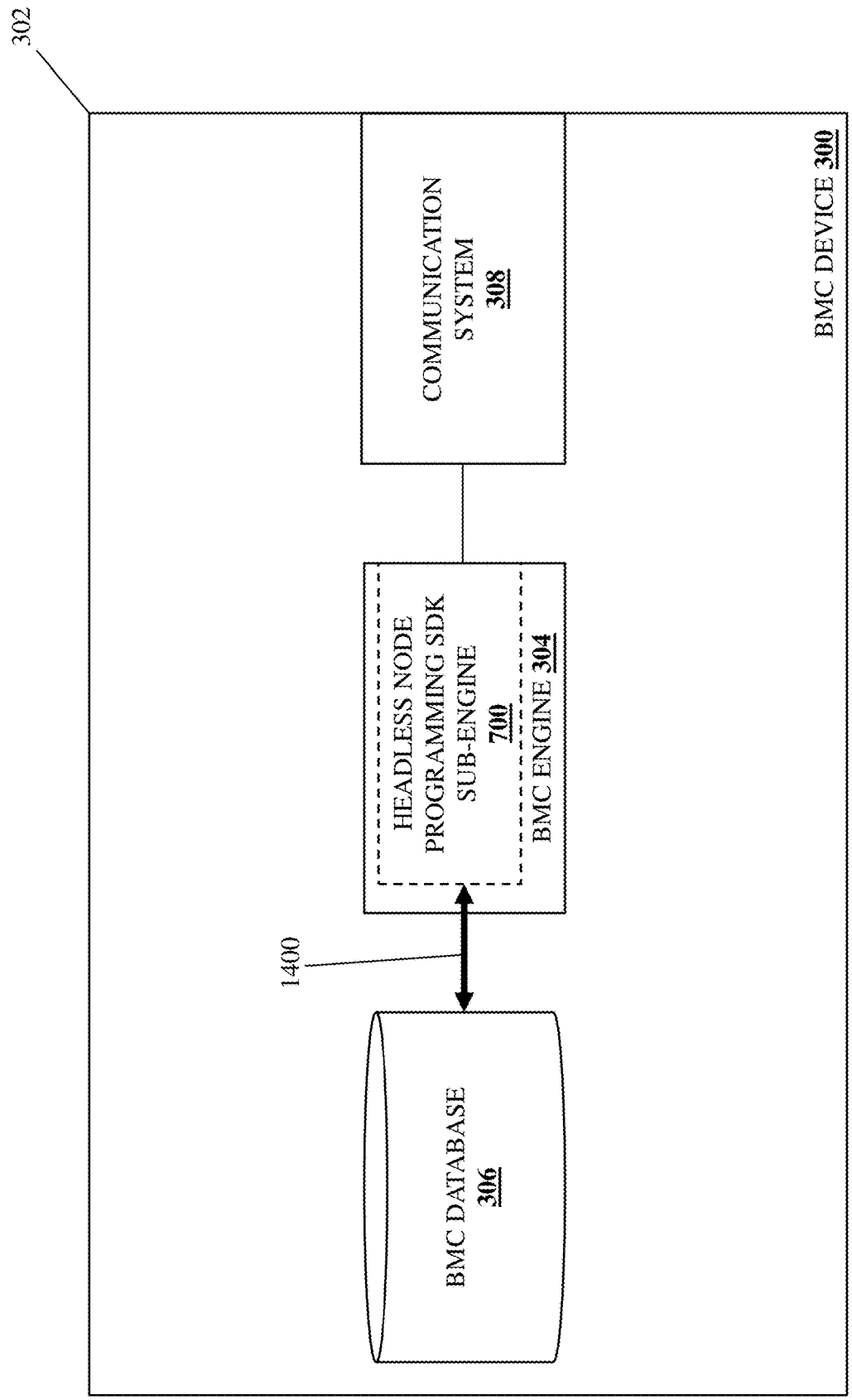
FIG. 14 is a schematic view illustrating an embodiment of the operation of the BMC device of FIG. 3 during the method of FIG. 4.

With reference to FIG. 14, the method 400 may return to decision block 402 and similarly as described above the BMC engine 304 in the BMC device 206/300 may perform headless node programming SDK authentication operations 1400 that may include accessing authentication information in the BMC database 306 and using that authentication information to authenticate the headless node programming SDK. As such, if at this performance of decision block 402 the headless node programming SDK is not authenticated, the method 400 proceeds to block 404 where the BMC device discards the headless node programming SDK similarly as described above. If at this performance of decision block 402 the headless node programming SDK is authenticated, the method 400 proceeds to block 406 where the BMC device configures itself with a headless node programming SDK subsystem using the headless node programming SDK received at block 412.

Figure 15:
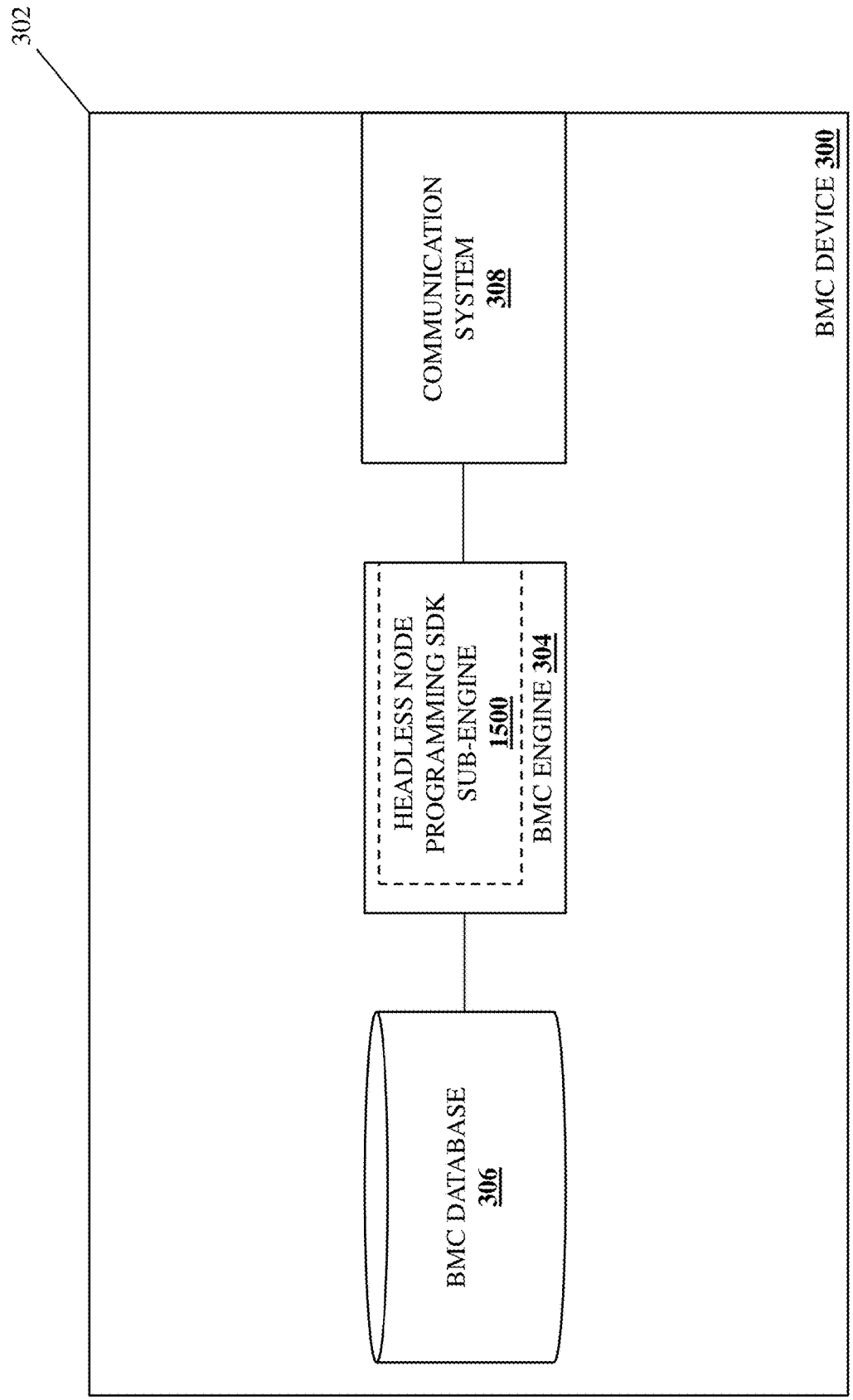
FIG. 15 is a schematic view illustrating an embodiment of the operation of the BMC device of FIG. 3 during the method of FIG. 4.

With reference to FIG. 15, in an embodiment of this performance of block 406 and in response to authenticating the headless node programming SDK using the authentication information stored in the BMC database, the BMC engine 304 in the BMC device 206a may use the headless node programming SDK to configure itself with a headless node programing SDK sub-engine 1500 similarly as described above. As such, one of skill in the art in possession of the present disclosure will appreciate how the BMC engine 304 may subsequent use the headless node programing SDK sub-engine 1500 to receive headless node access requests at decision block 408, determine whether those headless node access request are licensed at decision block 409, and execute those headless node access requests on the headless node device 212 similarly as described above with regard to its use of the headless node programing SDK sub-engine 700. Furthermore, one of skill in the art in possession of the present disclosure will appreciate how the BMC device 206/300 may be provided with other headless node programming SDKs and may use the headless node programming SDK sub-engines-subsystems they provide to execute any desired headless node access requests on subsequent iterations of the method 400 similar as described above as well.

Thus, systems and methods have been described that provide a headless node programming SDK on a BMC device that the BMC device may authenticate and use the configure itself with a headless node programming SDK subsystem, and then use that headless node programming SDK subsystem to program a headless node device. For example, the headless node programming system of the present disclosure may include a Baseboard Management Controller (BMC) device that is coupled to a headless node device. The BMC device receives a first headless node programming Software Development Kit (SDK) and authenticates the first headless node programming SDK. In response to authenticating the first headless node programming SDK, the BMC device uses the headless node programming SDK to configure itself with a first headless node programming SDK subsystem. The BMC device then uses the first headless node programming SDK subsystem to program first data on the headless node device. As such, BMC devices that are prevented from using their IPMI-over-LAN interface may be configured to program headless node devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A headless node programming system, comprising:
a headless node device; and
a Baseboard Management Controller (BMC) device that is coupled to the headless node device and that is configured to:
receive a first headless node programming Software Development Kit (SDK);
authenticate the first headless node programming SDK;
configure, using the first headless node programming SDK and in response to authenticating the first headless node programming SDK, the BMC device with a first headless node programming SDK subsystem; and
program, using the first headless node programming SDK subsystem, first data on the headless node device.

2. The system of claim 1, wherein the BMC device is configured to:
retrieve the first data from the first headless node programming SDK.

3. The system of claim 1, wherein the BMC device is configured to:
receive, using the first headless node programming SDK subsystem, the first data via a network; and
determine, in response to receiving the first data, that the first headless node programming SDK subsystem is licensed to program the first data on the headless node and, in response, program the first data on the headless node using the first headless node programming SDK subsystem.

4. The system of claim 1, wherein the BMC device is configured to:
receive, using the first headless node programming SDK subsystem, second data via a network; and
determine, in response to receiving the second data, that the first headless node programming SDK subsystem is licensed to program the first data on the headless node and, in response, program the first data on the headless node using the first headless node programming SDK subsystem.

5. The system of claim 1, wherein the BMC device is configured to:
receive a second headless node programming SDK;
authenticate the second headless node programming SDK;
configure, using the second headless node programming SDK and in response to authenticating the second headless node programming SDK, the BMC device with a second headless node programming SDK subsystem; and
program, using the second headless node programming SDK subsystem, second data on the headless node device.

6. The system of claim 1, further comprising:
an intermediary device coupling the BMC device to the headless node device, wherein the programming the first data on the headless node device using the first headless node programming SDK subsystem includes using the first headless node programming SDK subsystem to provide the first data to the intermediary device such that the intermediary device programs the first data on the headless node device.

7. An Information Handling System (IHS), comprising:
a Baseboard Management Controller (BMC) processing system; and
a BMC memory system that is coupled to the BMC processing system and that includes instructions that, when executed by the BMC processing system, cause the processing system to provide a BMC engine that is configured to:
receive a first headless node programming Software Development Kit (SDK);
authenticate the first headless node programming SDK;
configure, using the first headless node programming SDK and in response to authenticating the first headless node programming SDK, the BMC engine with a first headless node programming SDK sub-engine; and
program, using the first headless node programming SDK sub-engine, first data on a headless node device that is coupled to the BMC processing system.

8. The IHS of claim 7, wherein the BMC engine is configured to:
retrieve the first data from the first headless node programming SDK.

9. The IHS of claim 7, wherein the BMC engine is configured to:
receive, using the first headless node programming SDK sub-engine, the first data via a network; and
determine, in response to receiving the first data, that the first headless node programming SDK sub-engine is licensed to program the first data on the headless node and, in response, program the first data on the headless node using the first headless node programming SDK sub-engine.

10. The IHS of claim 7, wherein the BMC engine is configured to:
receive, using the first headless node programming SDK sub-engine, second data via a network; and
determine, in response to receiving the second data, that the first headless node programming SDK sub-engine is licensed to program the first data on the headless node and, in response, program the first data on the headless node using the first headless node programming SDK sub-engine.

11. The IHS of claim 7, wherein the BMC engine is configured to:
receive a second headless node programming SDK;
authenticate the second headless node programming SDK;
configure, using the second headless node programming SDK and in response to authenticating the second headless node programming SDK, the BMC engine with a second headless node programming SDK sub-engine; and program, using the second headless node programming SDK sub-engine, second data on the headless node device.

12. The IHS of claim 7, wherein the programming the first data on the headless node device using the first headless node programming SDK sub-engine includes using the first headless node programming SDK sub-engine to provide the first data to an intermediary device that is coupled to the BMC processing system such that the intermediary device programs the first data on the headless node device.

13. The IHS of claim 7, wherein the BMC engine is configured to:
receive, via a network using the first headless node programming SDK sub-engine, a request for the first data that was programmed on the headless node device;
read, using the second headless node programming SDK sub-engine, the first data from the headless node device; and
transmit, via the network using the second headless node programming SDK sub-engine, the first data.

14. A method for programming a headless node device, comprising:
receiving, by a Baseboard Management Controller (BMC) device, a first headless node programming Software Development Kit (SDK);
authenticating, by the BMC device, the first headless node programming SDK;
configuring, by the BMC device using the first headless node programming SDK and in response to authenticating the first headless node programming SDK, the BMC device with a first headless node programming SDK subsystem; and
programming, by the BMC device using the first headless node programming SDK subsystem, first data on the headless node device.

15. The method of claim 14, further comprising:
retrieving, by the BMC device, the first data from the first headless node programming SDK.

16. The method of claim 14, further comprising:
receiving, by the BMC device using the first headless node programming SDK subsystem, the first data via a network; and
determining, by the BMC device in response to receiving the first data, that the first headless node programming SDK subsystem is licensed to program the first data on the headless node and, in response, programming the first data on the headless node using the first headless node programming SDK subsystem.

17. The method of claim 14, further comprising:
receiving, by the BMC device using the first headless node programming SDK subsystem, second data via a network; and
determining, by the BMC device in response to receiving the second data, that the first headless node programming SDK subsystem is licensed to program the first data on the headless node and, in response, programming the first data on the headless node using the first headless node programming SDK subsystem.

18. The method of claim 14, further comprising:
receiving, by the BMC device, a second headless node programming SDK;
authenticating, by the BMC device, the second headless node programming SDK;
configuring, by the BMC device using the second headless node programming SDK and in response to authenticating the second headless node programming SDK, the BMC device with a second headless node programming SDK subsystem; and
programming, by the BMC device using the second headless node programming SDK subsystem, second data on the headless node device.

19. The method of claim 14, wherein the programming the first data on the headless node device using the first headless node programming SDK subsystem includes using the first headless node programming SDK subsystem to provide the first data to an intermediary device such that the intermediary device programs the first data on the headless node device.

20. The method of claim 14, further comprising:
receiving, by the BMC device via a network using the first headless node programming SDK subsystem, a request for the first data that was programmed on the headless node device;
reading, by the BMC device using the second headless node programming SDK subsystem, the first data from the headless node device; and
transmitting, by the BMC device via the network using the second headless node programming SDK subsystem, the first data.

\* \* \* \* \*